United States Patent [19]

Branigin et al.

[11] Patent Number: 4,471,456

[45] Date of Patent: Sep. 11, 1984

[54] MULTIFUNCTION NETWORK

[75] Inventors: Michael H. Branigin, Penllyn; Max P. Day, Colmar; John W. Greenleaf, Springfield, all of Pa.

[73] Assignee: Sperry Corporation, New York, N.Y.

[21] Appl. No.: 140,365

[22] Filed: Apr. 14, 1980

[51] Int. Cl.³ ............................................ G06F 13/00
[52] U.S. Cl. .................................. 364/900; 364/200
[58] Field of Search ................. 364/716, 200 MS File, 364/900 MS File

[56] References Cited

U.S. PATENT DOCUMENTS

| | | |
|---|---|---|
| 3,710,348 | 1/1973 | Craft . |
| 3,821,715 | 6/1974 | Huff, Jr. . |
| 3,980,992 | 9/1976 | Levy . |
| 3,988,717 | 10/1976 | Kisylia . |
| 4,010,448 | 1/1977 | Bennett . |
| 4,016,545 | 4/1977 | Lipovski . |
| 4,020,472 | 4/1977 | Bennett . |
| 4,124,890 | 11/1978 | Vasenkov ........................... 364/200 |
| 4,194,241 | 3/1980 | Mager ................................ 364/200 |
| 4,200,912 | 4/1980 | Harrington ........................ 364/200 |
| 4,222,116 | 9/1980 | Groves .............................. 364/900 |
| 4,255,785 | 3/1981 | Chamberlin ...................... 364/200 |

OTHER PUBLICATIONS

Chu, P., "Gate Array and 8 Bit Microprocessor Slice for Very High Speed ECL Design," EE Times Seminar, New York City, Jun. 22, 1979.
Chu, C., Chu, P.; Owen W. K., and Wong, D., "8 Bit Microprocessor Slices with Subnanosecond Performance Built with ECL Technonlogy," ISSCC, Philadelphia, Feb. 1979.
Simon, W. F. Memorandum with Attached Materials, Directed to Henri Jarrat Motorola Semiconductor Products, Inc., Nov. 11, 1977, with attached pp. 2-5, 7 and an unnumbered page.
Chu, P., "8-Bit Slice ECL Computer Component Family," *Computer Design,* Dec. 1979, pp. 134-139.
Viewgraphs, prepared by Fairchild Camera and Instrument Corp., presented about Sep. 1979, 29 pp.
*Electronic Engineering Times,* Feb. 18, 1980, pp. 46-47.
"High Performance ECL Slice Family Coming," *Electronic Design,* p. 19, Oct. 11, 1978.
"Single-Chip Microprocessor Employs Mini-Computer Word Length", Reyling, *Electronics,* Dec. 26, 1974, pp. 87-93.

*Primary Examiner*—Edward J. Wise
*Attorney, Agent, or Firm*—Griffin, Branigan & Butler

[57] ABSTRACT

A VLSI chip is provided for use with six bidirectional data buses and may be programmed to operate in one of four modes as a bidirectinal bus multiplexer, an error correction assist circuit, a register stack addressing circuit for direct or indirect addressing, or a multiport file. Depending on the mode of operation, some data buses may be utilized for inputting control signals to the chip, hence only five terminals are required which are dedicated to control signal use only. The circuits utilized in the four modes of operation share enough commonality to make it feasible to build the chip with the capabilities for operating in all modes, and then controlling it to function in only a single desired mode.

12 Claims, 14 Drawing Figures

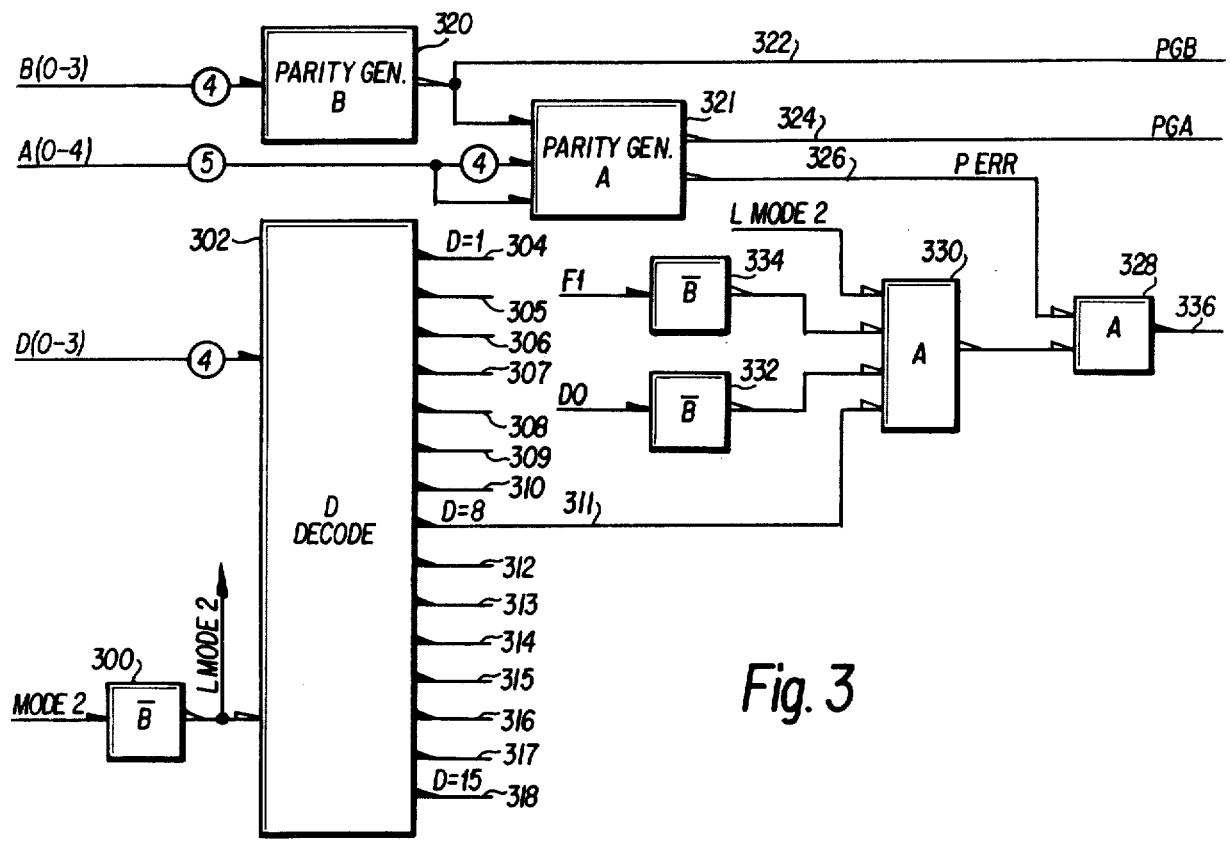
Fig. 3
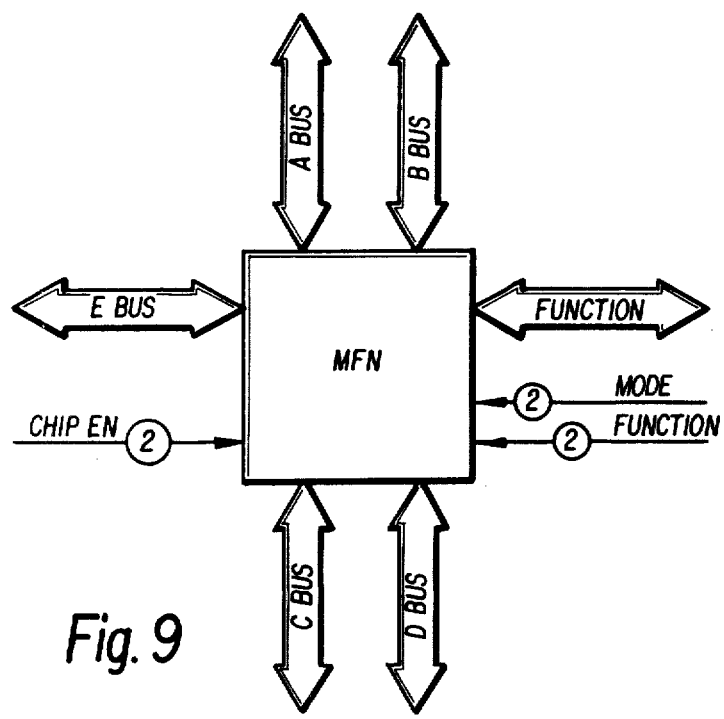
Fig. 9
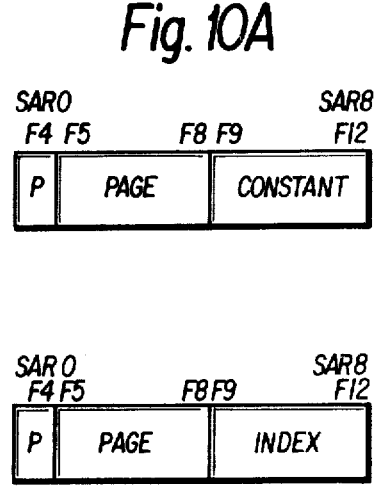
Fig. 10A
Fig. 10B

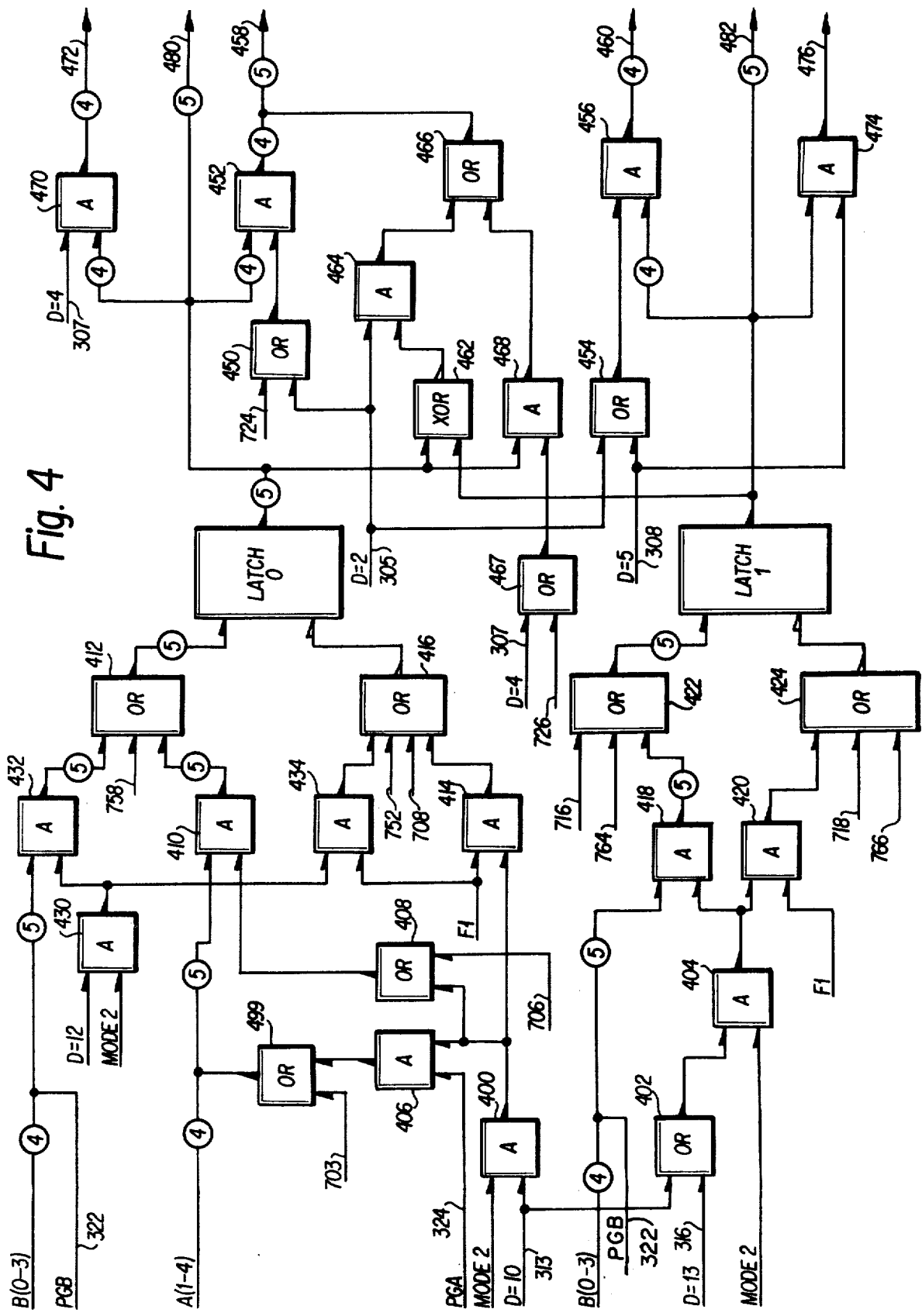

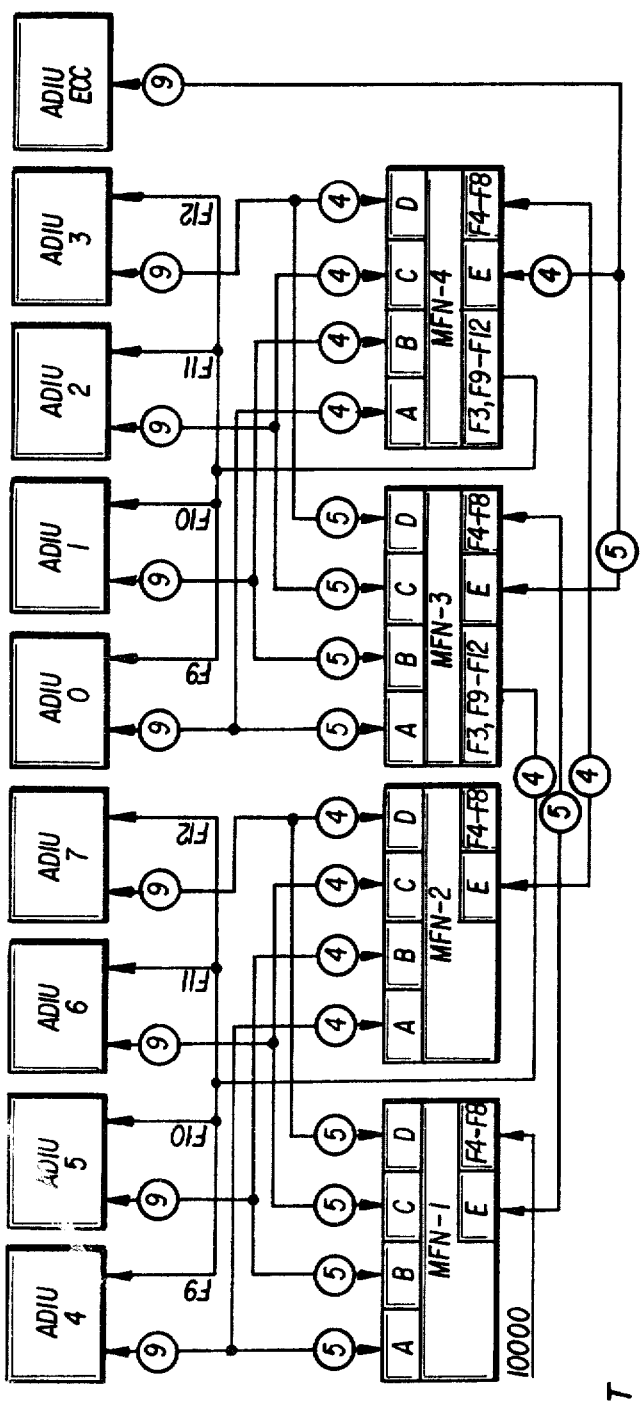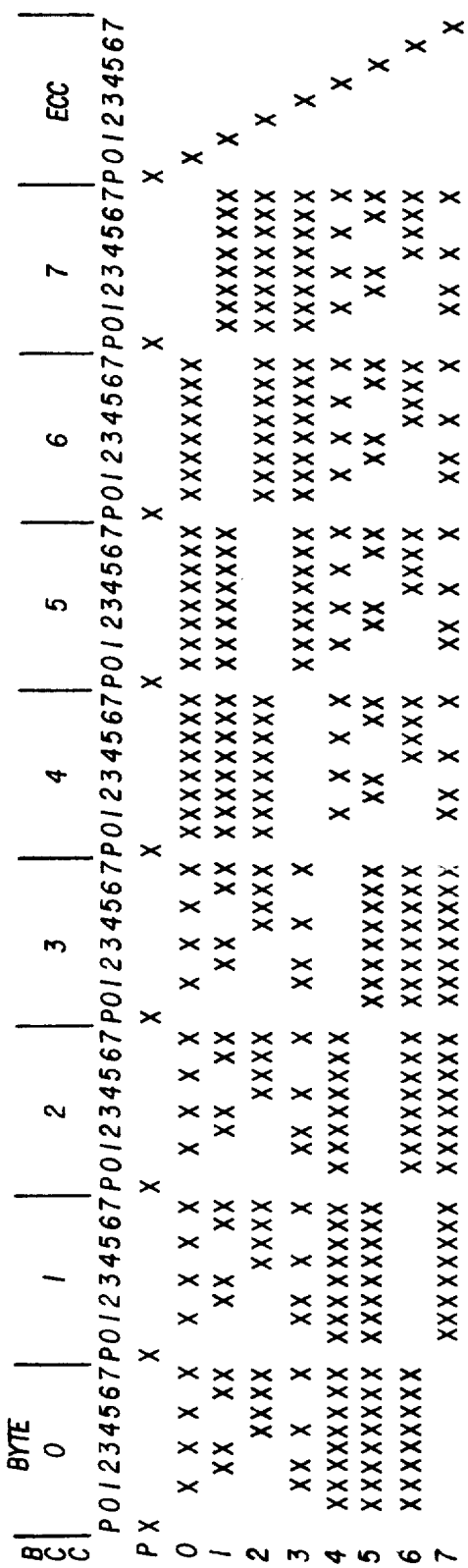
Fig. 12
Fig. 11 PRIOR ART

4,471,456

MULTIFUNCTION NETWORK

This application is related to the concurrently filed application of Michael H. Branigin et al., Ser. No. 140,267 entitled Address and Data Interface Unit, now U.S. Pat. No. 4,360,891 the disclosure of which is incorporated herein by reference.

BACKGROUND OF THE INVENTION

This invention relates to a multifunction network adapted to be constructed using very large scale integrated circuit techniques and capable of being controlled to operate in one of four selected modes of operation as a bidirectional bus multiplexer, an error correction assist circuit, a register stack addressing circuit for either direct or indirect addressing, or a multiport file.

In the construction of large scale data processing circuits it has long been the custom to construct the circuits in modular form with each module (chip, card, etc.) being dedicated to performing a particular function or functions. This approach has required a large number of different types of modules. As the techniques for fabricating integrated circuits have improved, larger and larger integrated circuits have been fabricated, and fabrication costs have been reduced. Thus, very large scale integrated circuits (VLSI) can now be fabricated at reasonable expense. However, because of space considerations it is desirable to keep to a minimum the number of external connections to the chip.

Certain data processing functions have enough commonality that, in forming a circuit to perform a first function, very little additional circuitry need be added so that a second function may be performed. The present invention utilizes this fact together with VLSI techniques to provide a chip which requires very few terminal connections compared to its data handling capabilities, and which may be programmed by voltages hardwired to two terminals to operate in any one of four modes. Thus, a multifunction network according to the present invention may be plugged into one receptacle having a first combination of voltages available at the mode selection terminals, and will operate as, for example a bidirectional bus multiplexer. The same multifunction network may alternatively be plugged into a second receptacle having a different combination of voltages at the mode selection terminals, and the multifunction network will operate as an addressing circuit for direct or indirect stack addressing. Since the multifunction network can be selectively programmed for different modes of operation, fewer different types of networks are required in order to build up a large scale modular data processing system. In addition, it offers the advantage that if a portion of a chip performing a first function in a system should fail, it might be interchanged with a chip performing a different function in order to keep the system operating. This of course assumes that the failed portion of the chip is not used in both functions.

SUMMARY OF THE INVENTION

An object of the present invention is to provide an integrated circuit capable of operating in a plurality of modes, and being programmable to operate in any selected one of the modes.

An object of the invention is to provide an integrated circuit having improved data handling capabilities.

A further object of the invention is to provide an integrated circuit capable of being connected to a plurality of bidirectional data buses, and being programmable by two mode control signals to function in any one of four modes as a bidirectional bus multiplexer, a multiport file, an error correction assist circuit, or an addressing circuit for direct or indirect addressing.

Another object of the invention is to provide an integrated circuit chip capable of operating in conjunction with a plurality of bidirectional data buses for receiving data from one of said buses and transferring it to any one or ones of said buses with a delay occasioned only by the transit time of the datarepresenting signals through the chip circuits.

Another object of the invention is to provide an integrated circuit chip capable of operating in conjunction with a plurality of bidirectional buses, and including mode selection means for causing certain of said buses to be concatenated to handle words having more bits than can be handled by one of said buses alone.

Another object of the invention is to provide an integrated circuit chip suitable for connection to up to six bidirectional buses and having control means for selectively gating data words on a plurality of said buses, one word at a time, to one of said buses, to accomplish byte parallel byte to serial data conversion.

Another object of the invention is to provide an integrated circuit chip suitable for connection to up to six bidirectional buses and having control means for selectively gating words appearing on one of said buses to the others of said buses in sequence, to accomplish byte serial to byte parallel data conversion.

A further object of the invention is to provide an integrated circuit chip for performing direct or indirect addressing and including means utilizing the value on a selected one of a plurality of bidirectional buses as the constant field of a direct address.

Another object of the invention is to provide a multifunction network adapted for connection to a plurality of bidirectional buses and having mode selection means and circuit means responsive to said mode selection means for utilizing signals from at least one of said buses as either data signals or control signals.

BRIEF DESCRIPTION OF THE DRAWINGS

FIG. 3 shows the D Bus decoder and A and B Bus parity generators utilized when the chip functions in mode 2 as a stack addressing circuit;

FIG. 4 shows Latch 0, Latch 1, and the input and output circuits utilized with these latches when operating in mode 2;

FIG. 9 is a schematic diagram indicating bus and control signal connections to the multifunction network chip;

FIGS. 10a and 10b illustrate the formats for direct and indirect addresses;

FIG. 11 illustrates an error correction code; and,

FIG. 12 shows a circuit for generating an error correction code and checking for errors.

DETAILED DESCRIPTION OF THE INVENTION

Figure 1A:
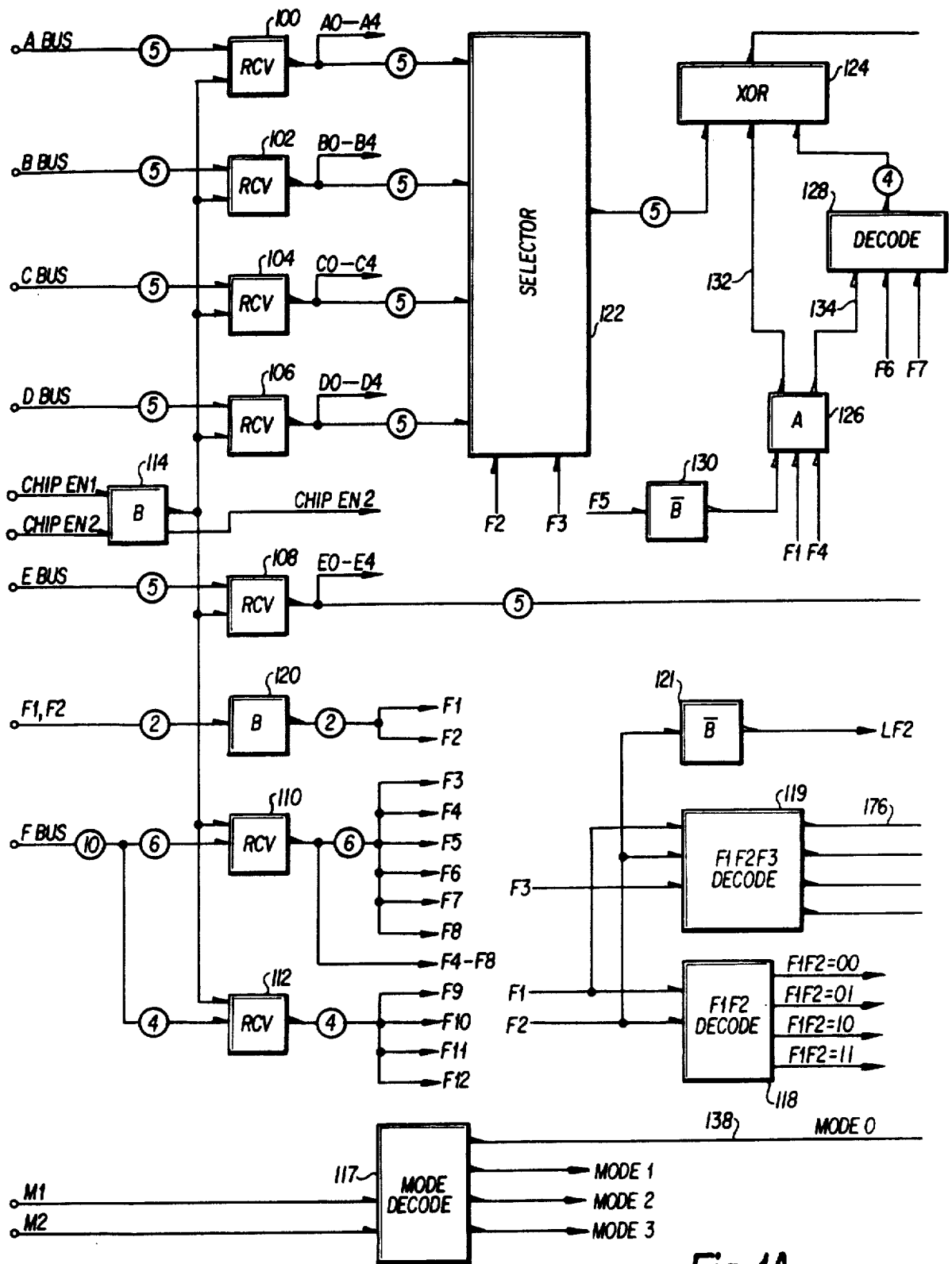
FIGS. 1A and 1B show the input receivers and output drivers for the chip as well as the logic circuits employed when the chip is operated in mode 0 as a bidirectional bus multiplexer.

The following description makes use of several conventions adopted in order to simplify both the drawings and the description. In the drawings, each element is assigned a three-digit reference numeral with the first digit signifying the figure of the drawing in which the element is located. Input leads to the various figures have been assigned threedigit reference numerals with the first digit designating the figure showing the source of the lead. There is one exception to this convention. The input leads without reference numerals shown in FIGS. 2-8 are all derived from FIG. 1A.

With respect to individual logic elements shown in the drawings, the arrow heads on the inputs and outputs indicate the signal levels when the logic element is active. For example, a 2-input AND having solid arrows at its inputs and an open arrow at its output indicates that the AND produces a true low level output signal only when both inputs are true at the high level. For purposes of the following description, a true condition represents a binary 1. On the buses a high level signal represents a true condition.

Referring first to FIG. 9, the multifunction net (MFN) is adapted to be embodied on a single hermetically sealed LSI chip having 41 logic terminals or pins through which signals may be transmitted to or received from circuits external to the chip when the chip board is inserted into a mating connector or receptacle. The chip is adapted to be connected to five bidirectional data buses A, B, C, D and E each capable of transmitting five binary bits in parallel. On these buses, bit 4 is the least significant bit and in some cases bit 0 is the most significant bit. When a parity bit is involved, it is bit 0 and bit 1 is the most significant data bit. The chip is also adapted to be connected to a bidirectional F(function) bus which may be utilized for either data transmission or the application of control signals to the chip. The F Bus has 10 positions for bidirectional transfers and twounidirectional positions for inputting control signals to the chip. The chip is also provided with terminals for receiving a chip enable signal as well as two mode signals which determines the particular mode in which the chip will operate. For purposes of clarity, the bias and power voltage inputs to the chip are not shown.

Figure 1B:
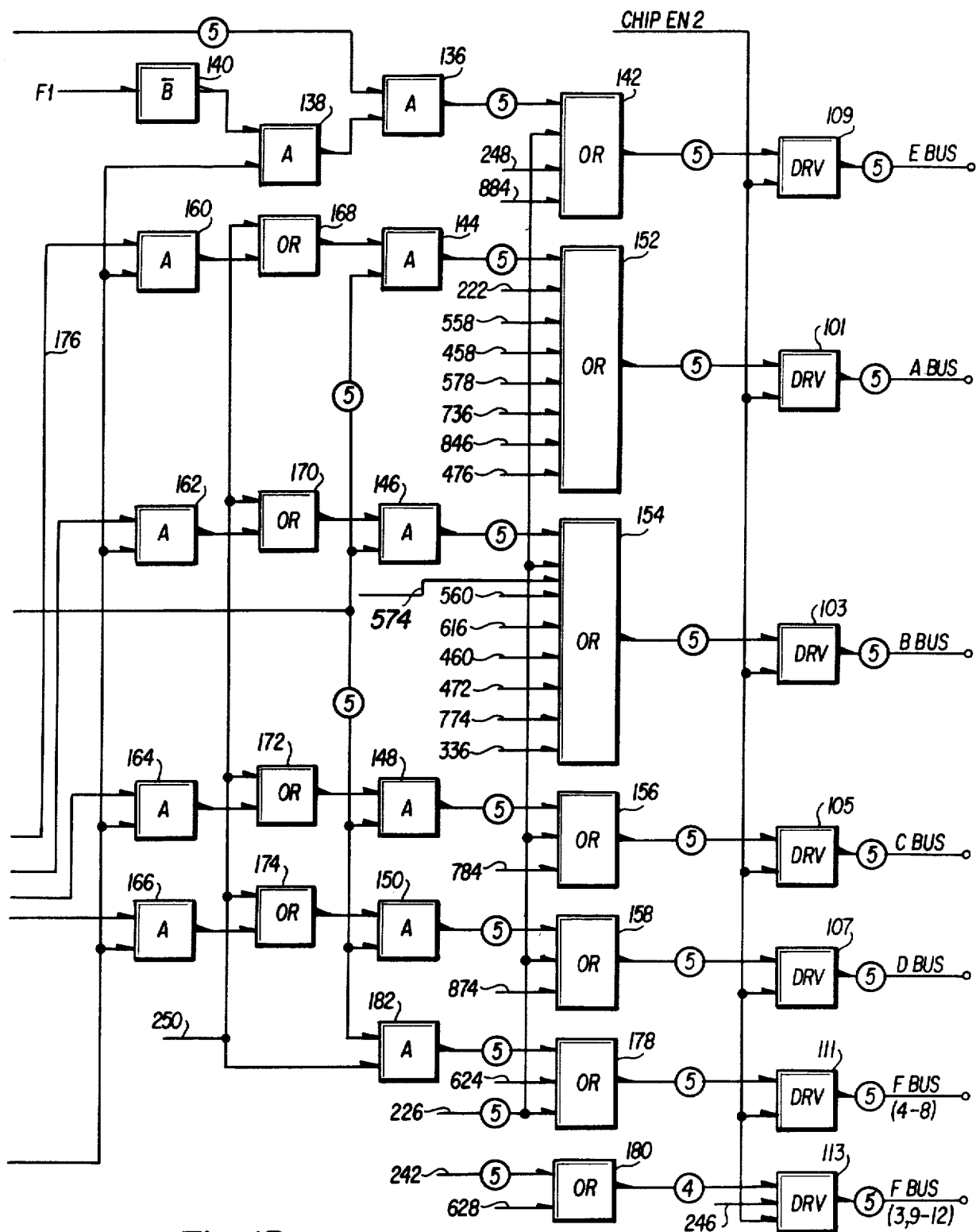

Referring now to FIGS. 1A and 1B, the MFN chip is provided with a set of five receivers 100 for receiving bits of data from the A Bus and a set of five drivers 101 for applying output bits of data from the chip to the A Bus. Data input signals on the B, C, D and E Buses are applied to sets of receivers 102, 104, 106, and 108, respectively. It will be understood that each of the reference numerals 100, 102, 104, 106 and 108 designates a set of five receivers which are essentially AND gates with each AND having one lead of its associated bus connected thereto. The other input of each of the ANDs is enabled by a chip enable signal as subsequently described. Output signals from the chip are applied to the B, C, D and E Buses through sets of drivers 103, 105, 107 and 109, respectively. Again, it will be understood that the reference numerals 101, 103, 105, 107 and 109 each represent a set of five drivers with each driver being essentially an AND gate for driving one lead of the associated bus.

The MFN is adapted to receive signals from, or apply signals to, an F Bus which serves primarily as the function control bus. The F Bus is capable of transmitting 12 binary bits (F1-F12) in parallel. Two positions of the F Bus (F1 and F2) are unidirectional. F1 and F2 are applied to two buffers 120 and the output signals F1 and F2 from buffers 120 are distributed throughout the chip to control various functions. Bit positions F3-F12 of the F Bus are bidirectional. Bit positions F3-F8 are applied to a set of six receivers 110 and the outputs from these receivers are the function control signals F3-F8 which are distributed throughout the chip. Bit positions F9-F12 are applied to a set of four receivers 112 and the outputs from these receivers are the signals F9-F12 which are distributed throughout the chip.

The chip is provided with two sets of drivers 111 and 113 for applying output signals from the chip to the F Bus positions 3 through 12. It should be understood that Buses A through E and F(3-12) are bidirectional hence connections (not shown for clarity) exist between the outputs of drivers 101, 103, 105, 107, 109, 111 and 113 and the inputs to the corresponding bus receivers shown in FIG. 1A.

In addition to the Buses A-F described above, the MFN chip is adapted to receive four control signals designated Chip Enable 1, Chip Enable 2, M1 and M2. No data may enter the chip unless the signal Chip Enable 1 is true and no signals may leave the chip unless Chip Enable 2 is true. Chip Enable 1 is passed through one of a pair of buffers 114 to enable all of the data bus receivers. The Chip Enable 2 signal is passed through a buffer 114 to the drivers of FIG. 1A. A decode circuit 118 receives the signals F1 and F2 and produces one of four output signals depending upon the values of F1 and F2. These signals are utilized by the circuits of FIG. 2 when the chip is operated in mode 1, and are utilized by the circuits of FIGS. 7 and 8 when the chip is operated in mode 3.

A decoder circuit 119 receives the signals F1, F2 and F3 and produces one of four output signals. These signals are utilized in FIG. 1 when the chip is operated in mode 0.

Figure 2:
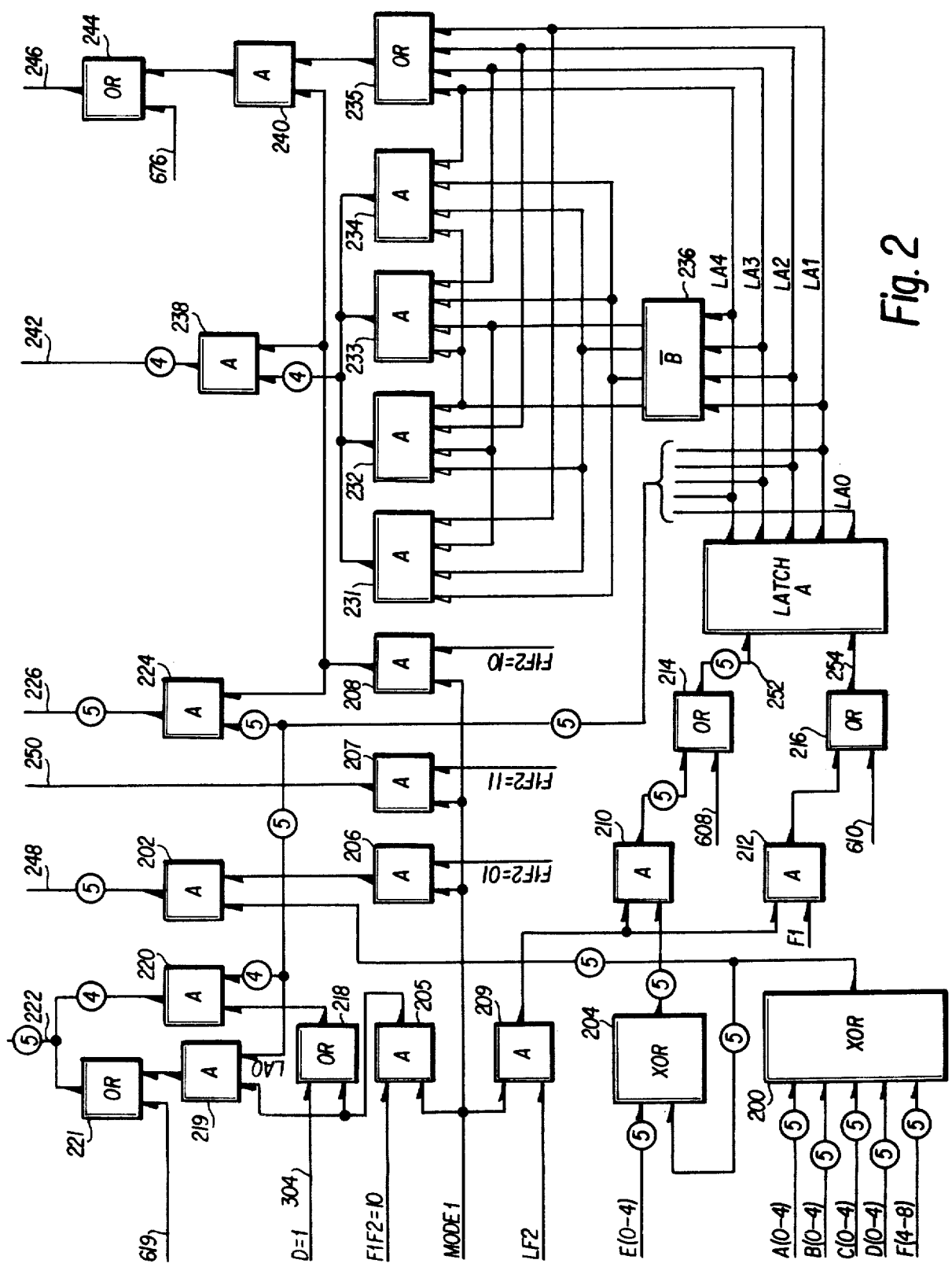
FIG. 2 shows the logic circuits utilized in the chip when it is operated in mode 1 as an error correction assist circuit.

The signal F2 is passed through an inverting buffer 121 to produce LF2 which is utilized by the circuits of FIG. 2 during mode 1 operations.

The input signals M1 and M2 are applied to a mode decode circuit 117. M1 and M2 are the programming or mode select signals and determine the mode in which the chip will operate. Once the mode is selected by M1 and M2, the particular functions performed within that mode are determined by the signals F1-F12 derived from the F Bus.

It is contemplated that the signals M1 and M2 will normally be hard wired through chip pin connections to fixed voltages thereby fixing the mode of the chip for a particular use. However, it is possible to make a programmed change of modes by changing the combination of signals applied to M1 and M2. This would normally be done only when a chip is being tested. During the changeover period, the Chip Enable 2 signal must remain false in order to prevent outputs from the chip from disturbing the buses. Furthermore, if a dynamic change of mode is undertaken, it is possible that internal latches located on the chip and subsequently described may not hold the data contained therein.

The four modes of chip operation are described below in detail. In the following description the reader should keep in mind the fact that all input terminals to the chip are shown in FIG. 1A while all output terminals for the chip are shown in FIG. 1B. Also, all input buses and leads shown in FIGS. 2–8 are derived from FIG. 1A.

MODE ZERO

When the mode selection signals M1 and M2 are both false (i.e. 00) the MFN operates in Mode 0 and functions as a bidirectional bus multiplexer. One of the four Buses A, B, C or D may be gated to Bus E, or Bus E can be gated to one of the Buses A, B, C or D. Bus routing is determined by three control bits derived from the F Bus. As indicated in Table I, F1 determines the direction and F2 and F3 select which of the Buses A, B, C or D is to communicate with the E Bus.

TABLE I

| F1 | F2 | F3 | Function |
|----|----|----|----------|
| 0 | 0 | 0 | A Bus to E Bus |
| 0 | 0 | 1 | B Bus to E Bus |
| 0 | 1 | 0 | C Bus to E Bus |
| 0 | 1 | 1 | D Bus to E Bus |
| 1 | 0 | 0 | E Bus to A Bus |
| 1 | 0 | 1 | E Bus to B Bus |
| 1 | 1 | 0 | E Bus to C Bus |
| 1 | 1 | 1 | E Bus to D Bus |

Another function performed in Mode 0 is an Exclusive Or (XOR) operation on data being routed from one of the Buses A, B, C or D to the E Bus. This function is performed only when F1=0, F4=0 and F5=1. F6 and F7 are used to select one of four XOR patterns which are XORed with the selected Bus A, B, C or D selected in accordance with the pattern of Table I. Table II shows the XOR patterns which are XORed with the bits from the selected bus.

TABLE II

| F1 | F4 | F5 | F6 | F7 | XOR Pattern 01234 |
|----|----|----|----|----|-------------------|
| 0 | 0 | 1 | 0 | 0 | 10001 |
| 0 | 0 | 1 | 0 | 1 | 10010 |
| 0 | 0 | 1 | 1 | 0 | 10100 |
| 0 | 0 | 1 | 1 | 1 | 11000 |

FIGS. 1A and 1B show all of the circuits of the MFN which come into play when the chip is operating in Mode 0. The outputs of receivers 100, 102, 104 and 106 are all connected as inputs to a selector 122. Selector 122 also receives the signals F2 and F3 to select as the output of the selector the input from Bus A, B, C or D, the selection being made in accordance with Table I. The output signals from selector 122 are applied as one set of inputs to five XORs 124.

The second set of inputs to XORs 124 is derived from an AND 126 and a decode circuit 128. The function control signal F5 is passed through an inverting buffer 130 and applied to one input of AND 126. Function control signals F1 and F4 are applied to other inputs of AND 126. Assuming F1, F4 and F5 do not have the values 0, 0 and 1 respectively, AND 126 produces a zero output on lead 132 and a 1 output on lead 134. The zero on lead 132 is applied to one XOR 124 while the one signal on lead 134 disables decoder 128 so that it produces four zero signals that are applied to the other four XOR's 124. Thus, the five bit output value from selector 118 is XORed at 124 with five zero bits and thus passes unchanged through XORs 124 to a set of five ANDs 136.

For mode zero operation, the mode selection bits M1 and M2 are both zero. The mode decode circuit 117 produces the signal Mode 0 and this signal is applied as one input to an AND 138. The function control signal F1 is passed through an inverting buffer 140 and applied as a second input to AND 138. The output of AND 138 enables the ANDs 136 during Mode 0 if F1=0 to thereby pass the outputs from XORs 124 through to a set of five ORs 142. The outputs from ORs 142 drive the E Bus drivers 109 which are further conditioned by the chip enable signal. Thus, the five bit value on any of the Buses A through D may be selectively gated through the circuit just described to the E Bus without change. Furthermore, the transfer from one bus to another through the chip is accomplished in one microcycle or clock pulse interval with only the internal gate delays.

As shown in Table II, the output of selector 122 is XORed with a specific pattern of bits (other than all zeros) if F1 and F4 are both zero and F5 is a one. Under these conditions AND 126 is enabled to produce a binary one on lead 132. This signal is applied as the input to the XOR circuit 124 associated with the parity (high order) bit position. AND 126 also produces a zero output on lead 134 to enable decoder 128. Depending upon the combination of signals F6 and F7 applied to decoder 128 the decoder produces a pattern of four output bits (see Table II) which are applied to the XOR circuits 124 associated with the four low order bit positions. The resulting five bit value is then passed through ANDs 136, ORs 142 and drivers 109 to the E Bus.

In order to accomplish the transfer of a five bit byte of data from the E Bus to one of the Buses A through D, the outputs of E Bus receivers 108 are connected to four sets of ANDs 144, 146, 148 and 150. ANDs 144 have their outputs connected through five ORs 152 to the A Bus drivers 101. In like manner, ANDs 146 have their outputs connected through a set of ORs 154 to the B Bus drivers 103; ANDs 148 have their outputs connected through a set of ORs 156 to the C Bus drivers 105; and ANDs 150 have their outputs connected through a set of ORs 158 to the D Bus drivers 107.

As shown in Table I, function bits F1-F3 determine the bus to which the data on Bus E is transferred. The bits F1-F3 are applied to the decoder circuit 119 which is further enabled by the inverted chip enable signal from buffer 116. Decoder 119 has four output leads which are individually connected to four ANDs 160, 162, 164 and 166. These ANDs are all enabled by the signal Mode 0 derived from decoder 117. AND 160 is connected through an OR 168 to the enabling inputs of the ANDs 144. In like manner, AND 162 is connected through an OR 170 to enable ANDs 146, AND 164 is connected through an OR 172 to enable ANDs 148, and AND 166 is connected through an OR 174 to enable ANDs 150.

As a typical example of operation, consider the case where the contents of the E Bus are to be transferred to the A Bus. From Table I it is seen that F1 must be 1 while F2 and F3 must be 0. F1 and F2 from the F Bus are passed through buffers 120 and applied to decoder 119. F3 passes from the F Bus through one of the receivers 110 and is applied to another input of decoder 119. Decoder 119 thus produces a signal on lead 176 to enable one input of AND 160. Since M1M2=00 the MFN is operating in mode 0 and the Mode 0 signal from decoder 117 enables a second input of AND 160. The resulting output from AND 160 passes through OR 168 and enables the five ANDs 144. The value on the E Bus is gated through receivers 108 by the Chip Enable signal and applied to the ANDs 144. Thus, the value on the E Bus passes through ANDs 144, ORs 152 and drivers 101 to the A Bus.

MODE ONE

When the mode bits M1M2=01, the MFN operates in Mode 1 to assist in error correction code generation. This mode requires that the MFN have six bidirectional buses each five bits wide, and an internal latch. In order to obtain six bidirectional buses, the F Bus is split and bit positions F4–F8 are utilized as a 5-bit bidirectional bus. F3 and F9–F12 serve an error location matrix function while F1 and F2 serve as the control signals. Table III summarizes the functions performed for the various combinations of values for F1 and F2.

TABLE III

| F1 | F2 | Function |
|---|---|---|
| 0 | 0 | Do nothing |
| ↑ | 0 | A ⩛ B ⩛ C ⩛ D ⩛ E ⩛ F to the output of Latch A |
| 1 | 0 | Latch A to A,B,C,D,E,F. |
| 0 | 1 | A ⩛ B ⩛ C ⩛ D ⩛ F to E. |
| 1 | 1 | E to A,B,C,D,F. |
| ↑ | | = Leading Edge |
| ⩛ | | = Exclusive OR |

Referring to FIG. 2, an Exclusive OR circuit 200 has five sets of inputs for performing an Exclusive OR function on five five-bit bytes of data applied to the MFN over the A,B,C,D and F Buses. The bits A(0-4), B(0-4), C(0-4), D(0-4) and F(4-8) are derived from the A, B, C, D, and F Bus receivers respectively, of FIG. 1A, and are applied to XOR 200. The output of XOR 200 is a five bit byte which is applied to a set of ANDs 202 and to one set of inputs of an XOR circuit 204.

In FIG. 1A, the mode control signals M1M2 have the value 01 so that mode decoder 117 produces the signal Mode 1. In FIG. 2, the signal Mode 1 enables one input of a plurality of ANDs 205–209. These ANDs are further enabled by the output signals from decoder 118 to control the error correction assist circuits as the signals F1 and F2 assume the states 00, 10, 01 and 11. ANDs 205 and 208 are enabled by the signal F1F2=10, AND 206 is enabled by the signal F1F2=01, and AND 207 is enabled by the signal F1F2=11.

The signal LF2 enables AND 209 as long as F2=0. The output of AND 209 enables a set of ANDs 210 and a further AND 212. When F1 and F2 have the value 00 decoder 118 produces an output F1F2=00 that is not used. However, LF2 passes through AND 209 to enable ANDs 210 and 212. AND 212 is blocked at this time because F1 is false, but ANDs 210 pass the outputs of XOR 204 through a set of ORs 214 to the data inputs of Latch A. Latch A has five positions with LA4 being the low order position and LA0 being the parity bit position. XOR circuit 204 receives at one set of inputs the signals E(0-4) which are derived from the E Bus receivers 108. XOR 204 receives at the second set of inputs the XOR result obtained from XORs 200. Thus, the result obtained by taking the XOR of the contents of the A, B, C, D, E, and F Buses is passed from XOR 204 through ANDs 210 and ORs 214 to Latch A during the interval F2=0.

Next, F1 becomes 1 while F2 remains 0. On the transition of F1 from 0 to the 1 state, the signal F1 passes through AND 212 and an OR 216 to the enabling input of Latch A. This loads the output of XOR 204 into Latch A. With F1F2=10, ANDs 205 and 208 are enabled. The output of AND 205 is applied to an AND 219 and is passed through an OR 218 to enable a set of four ANDs 220. The four low order bit positions of Latch A (LA1–LA4) are applied to ANDs 220 and are gated through the ANDs to four of the leads 222. LA0 is applied to AND 219 and the output of AND 219 is passed through an OR 221 to a fifth lead 222. The leads 222 are connected to the set of ORs 152 so that the contents of Latch A are passed through ORs 152 and drivers 101 to the A Bus.

At the same time, the contents of Latch A are applied to the inputs of a set of ANDs 224 all of which are enabled by the output of AND 208. The outputs of ANDs 224 are connected by leads 226 to the sets of ORs 154, 156, 158, 142 and 178. Thus, the contents of Latch A are simultaneously applied to buses B, C, D, E, and F at the same time as they are applied to Bus A. With respect to Bus F, the contents of Latch A are applied to bit positions F4–F8.

Simultaneously with the application of the contents of Latch A to Buses A–F, the contents of Latch A are applied to an error location matrix and the output from this matrix is applied to bit positions 3 and 9–12 of the F Bus. The error location matrix comprises four ANDs 231–234 and an OR 235. LA4 is applied as one input to OR 235 and AND 234. In addition, LA4 is passed through one of a set of inverting buffers 236 and applied as an input to ANDs 231–233. LA3 is applied to AND 233 and OR 235, and is passed through a buffer 236 and applied to ANDs 231, 232, and 234. LA2 is applied to AND 232 and OR 235, and is passed through a buffer 236 and applied to ANDs 231, 233, and 234. LA1 is applied to AND 231 and OR 235, and is passed through a buffer 236 and applied to ANDs 232–234.

The outputs of ANDs 231–234 are applied to a set of four ANDs 238 and the output of OR 235 is applied to an AND 240. ANDs 238 and 240 are all enabled by the output of AND 208 during the interval F1F2 = 10. The outputs from ANDs 238 are applied by leads 242 to a set of four ORs 180 and the outputs of ORs 180 drive the drivers 113 for F Bus positions 9–12. The output of AND 240 is passed through an OR 244 and over a lead 246 to the driver 113 which drives the lead F3 of the F Bus.

The contents of Latch A, acting through the error location matrix, drive positions F3 and F9–F12 of the F Bus true in accordance with Table IV.

TABLE IV

| Latch A Contents | F Bus |
|---|---|
| LA1 V LA2 V LA3 V LA4 | F3 |
| $\overline{\text{LA1}}$ ∧ LA2 ∧ LA3 ∧ LA4 | F9 |
| LA1 ∧ $\overline{\text{LA2}}$ ∧ LA3 ∧ LA4 | F10 |
| LA1 ∧ LA2 ∧ $\overline{\text{LA3}}$ ∧ LA4 | F11 |
| LA1 ∧ LA2 ∧ LA3 ∧ $\overline{\text{LA4}}$ | F12 |

Where:
V = Logical OR
∧ = Logical AND

When the MFN chip is operating in Mode 1 and F1F2 have the value 01, decoder 118 produces the signal F1F2=01 which is passed through AND 206 to enable a set of ANDs 202. The result obtained by taking the XOR of the values on the A, B, C, D, and F Buses is applied by XOR circuit 200 to ANDs 202. The outputs from ANDs 202 are applied over bus 248 and through ORs 142 and drivers 109 to the E Bus.

When the MFN chip is operating in Mode 1 and F1F2=11, decoder 118 produces the signal F1F2=11 to enable AND 207. AND 207 is connected by a lead 250 to an input of each of the ORs 168, 170, 172 and 174 and an AND 182 so that when AND 207 is enabled ANDs 144, 146, 148, 150 and 182 are enabled. The value on the E Bus may thus pass through receivers 108, ANDs 144, 146, 148, 150 and 182, ORs 152, 154, 156, 158 and 178 and drivers 101, 103, 105, 107 and 111 to the A, B, C, D and F Buses.

A plurality of MFNs may be programmed for Mode 1 to operate in cooperation with a plurality of ADIUs of the type disclosed in the above mentioned copending application to generate an error correcting code based on the pattern shown in FIG. 11. FIG. 11 illustrates the pattern for generating the error correcting code for an 8-byte word where each byte comprises a parity bit P and eight data bits 0-7. The error correction code (ECC) comprises a parity bit and bits 0-7. As shown in FIG. 11, bit 0 of ECC is obtained by taking the XOR of 40 bits of the word, these bits being bits 1, 3, 5 and 7 of bytes 0, 1, 2 and 3, and bits 0-7 of bytes 4, 5, and 6. In like manner, bits 1-7 of ECC are each obtained by taking the XOR of 40 bits of the word. The specific bits of the word employed in generating bits 1-7 of ECC are illustrated by the X's in FIG. 11.

In order to generate the ECC for the 8-byte word shown in FIG. 11, eight ADIU's are required. As explained in the aforementioned copending application, each ADIU is capable of receiving a single byte (8 bits plus parity) and generating an eight bit plus parity byte correction code (BCC) in accordance with the following table.

| BYTE CORRECTION CODE BIT | | BYTE 0 BITS |
|---|---|---|
| P | = | P |
| 0 | = | $1 \veebar 3 \veebar 5 \veebar 7$ |
| 1 | = | $2 \veebar 3 \veebar 6 \veebar 7$ |
| 2 | = | $4 \veebar 5 \veebar 6 \veebar 7$ |
| 3 | = | $1 \veebar 2 \veebar 4 \veebar 7$ |
| 4 | = | $1 \veebar 2 \veebar 3 \veebar 4 \veebar 5 \veebar 6 \veebar 7$ |
| 5 | = | $1 \veebar 2 \veebar 3 \veebar 4 \veebar 5 \veebar 6 \veebar 7$ |
| 6 | = | $1 \veebar 2 \veebar 3 \veebar 4 \veebar 5 \veebar 6 \veebar 7$ |
| 7 | = | 0 |

Comparison of FIG. 11 with the foregoing table shows that the BCC generated in accordance with the foreoing table is the BCC for byte 0. In FIG. 12, all ADIUs for bytes 0-7 are identical and generate the same BCC. However, from inspection of FIG. 11 it is evident that the BCC for bytes 1 through 7 may be obtained by interchanging bits of the BCC generated for byte 0. For example, the BCC for byte 1 is obtained by interchanging bits 6 and 7 of the BCC for byte 0; the BCC for byte 2 is obtained by interchanging bits 7 and 5 of the BCC for byte 0, etc. In FIG. 12, this interchange of bits is accomplished by interchanging the outputs from an ADIU to a bus.

In FIG. 12, the resulting BCC from each ADIU (after interchanging of bits) is applied to two MFNs. The ADIU which generates the BCC for byte 4 is connected so that the four low order bit positions of the BCC are applied to the A Bus inputs (positions 1-4) of MFN-2 and the parity and four high order bits are applied to the A Bus inputs of MFN-1. In like manner, the BCCs generated for bits 5, 6 and 7 are split and applied to the B, C and D Bus inputs, respectively of MFN-1 and MFN-2.

The BCCs for bytes 0, 1, 2 and 3 are likewise split and applied to MFN-3 and MFN-4. The BCC for byte 0 is applied to the A Bus inputs, the BCC for byte 1 is applied to the B Bus inputs, the BCC for byte 2 is applied to the C Bus inputs and the BCC for byte 3 is applied to the D Bus inputs.

FIG. 12 is utilized to generate the final ECC as follows. The four MFNs are programmed for Mode 1 operation with F1F2=00. The BCCs are applied to the A, B, C, and D Buses as described above. In addition, the value 10000 is applied over F4-F8 to MFN-1 for the purpose of maintaining correct parity. Referring to FIG. 2, the values on the A, B, C, D, and F Buses of MFN-1 are XORed at 200 and applied to ANDs 202. In MFN-2, the same operation takes place except that the F Bus has a value of 0 and only four bits are applied to the XOR 200 from the lower orders of the Buses A, B, C and D.

Next, F2, as applied to MFN-1 and MFN-2 is switched so that F1F2=01. Again referring to FIG. 2, this enables AND 206 which in turn enables the ANDs 202. This occurs in both MFN-1 and MFN-2 simultaneously. In each MFN the results of the XOR operation are passed through gates 202, ORs 142, and drivers 109 to the E Bus.

In FIG. 12, the E Bus output of MFN-1 is applied to the F4-F8 inputs of MFN-3 while the E Bus output of MFN-2 is applied to the F4-F8 inputs of MFN4. The BCCs for bytes 0-3 are applied to the A, B, C and D bus inputs of MFN-3 and MFN-4. When F1F2, as applied to MFN-3 and MFN-4, are switched to 01, MFN-3 and MFN-4 take the Exclusive OR of the values applied to their A, B, C, D and F Buses and the result appears on the E Buses. This result is the final ECC which is passed to an ECC ADIU so that it may, for example, be stored in memory along with the word to which it relates.

To check for errors, the received ECC is XORed with a generated ECC and the result passed on to the ADIUs. The ADIUs perform the actual correction function as described in the aforementioned copending application. Assume for example that an 8-byte word and its ECC are read from memory and entered into the ADIUs shown at the top of FIG. 12. MFN-1 and MFN-2 are operated in the same manner as when generating an ECC so as to produce at the E Bus output the generated check code for bytes 4, 5, 6, and 7. The E Bus outputs of MFN-1 and MFN-2 are applied to the F4-F8 inputs of MFN-3 and MFN-4, respectively. Bytes 0-3 and the ECC byte are applied from the ADIUs to the A, B, C, D, and E Buses, respectively of MFN-3 and MFN-4. During this interval F1F2=00 for MFN-3 and MFN-4. As seen in FIG. 2, under these conditions the XOR 204 in each of MFN-3 and MFN-4 produces the Exclusive OR of the values on the Buses A-F. Because F2=0, the output of AND 209 enables ANDs 210 so that the resulting output from XOR 204 is applied through ORs 214 to the data input of Latch A.

Next, F1 is set to 1 at MFN-3 and MFN-4. On the transition of F1 from 0 to 1, the signal F1 passes through AND 212 and OR 216 to load Latch A and enter therein the result obtained by taking the Exclusive OR of the values on the A-F Buses. The input data on buses A-F must be terminated immediately after F1 changes to 1 to avoid an ORing with the contents of Latch A now made available on Buses A through F. In FIG. 2, F1F2=10 enables ANDs 205 and 208 which in turn enable ANDs 219, 220, and 224. The contents of Latch A are passed through ANDs 219 and 220 to the A Bus and through ANDs 224 to the B, C, D, E, and F Buses, as previously described.

The values on the A, B, C, D, and E Buses of MFN-3 and MFN-4 are applied to the ADIUs for bytes 0–3 and ECC. However, only one of the ADIUs for bytes 0–3 will be enabled to accept the error syndrome as subsequently described.

The error syndrome available at the F Bus outputs (F4-F8) of MFN-3 and MFN-4 is also applied to the E Bus inputs of MFN-1 and MFN-2. The signal F1 applied to MFN-1 and MFN-2 is changed from 0 to 1 so that F1F2=11 as applied to MFN-1 and MFN-2. As seen in FIG. 2, this enables AND 207 in each MFN and the output from AND 207 is applied over lead 250 and through ORs 168, 170, 172, and 174 to enable ANDs 144, 146, 148, and 150. The error syndrome is then passed from the E Bus input to the A, B, C, and D Buses and applied to ADIUs bytes 4–7. Again, only one of the ADIUs may be enabled to accept the error syndrome.

At the time F1 made the transition from 0 to 1 at MFN-3 and MFN-4 to load Latches A in these MFNs with the error syndrome, the error syndrome indicates which bit contained an error. The subsequent operations described above distributed this error syndrome to all of the ADIUs for bytes 0–7. Only one of the ADIUs should be enabled to accept the error syndrome and perform the actual error correction. To determine which byte contains the error, the contents of Latch A are applied to the error location matrix shown in the right-hand portion of FIG. 2. The error location matrix generates a 5-bit code which is applied over Bus 242 and lead 246 to the drivers for F3 and F9–F12. Bits F9–F12 from MFN-4 control the ADIUs for bytes 0–3, respectively to enter the error syndrome into the ADIU which services the byte in which the error is located. In like manner, the F9–F12 outputs of MFN-3 enable the error syndrome to be gated into the ADIUs servicing bytes 4–7. The actual correction of the error takes place in one of the ADIUs enabled to receive the error syndrome. For single bit errors, the parity of the error syndrome will be 0 and at least one syndrome bit will be set as indicated by the F3 output of MFN-3 or MFN-4. Multiple bit errors are indicated when the syndrome parity is 1 and at least one syndrome bit is set as indicated by the F3 output of MFN-3 or MFN-4. A bad parity on the syndrome byte indicates a hardware failure.

MODE 2

General Considerations For Mode 2

The MFN operates in Mode 2 (M1M2=10) to perform register stack addressing. In this mode the MFN may develop and apply to the F Bus (F4–F12) a 9-bit direct address having the format illustrated in FIG. 10A or a 9-bit indirect address having the format shown in FIG. 10B. A direct address includes a parity bit, a four-bit page field, and a four-bit constant field. An indirect address includes a parity bit, a four-bit page field, and a four-bit index field. The constant field of a direct address is derived directly from either the C Bus or the E Bus as subsequently explained. The page field for a direct address and the page and index fields for indirect addresses are derived from storage registers or latches within the MFN and in this case the selection control signals are derived from the C Bus or E Bus.

Latches A and B (FIG. 6) store page fields for addressing. Latch A has five bit positions designated LA0-LA4 with LA0 being the parity bit and LA4 being the least significant bit. Latch B is similar to Latch A.

Figure 5:
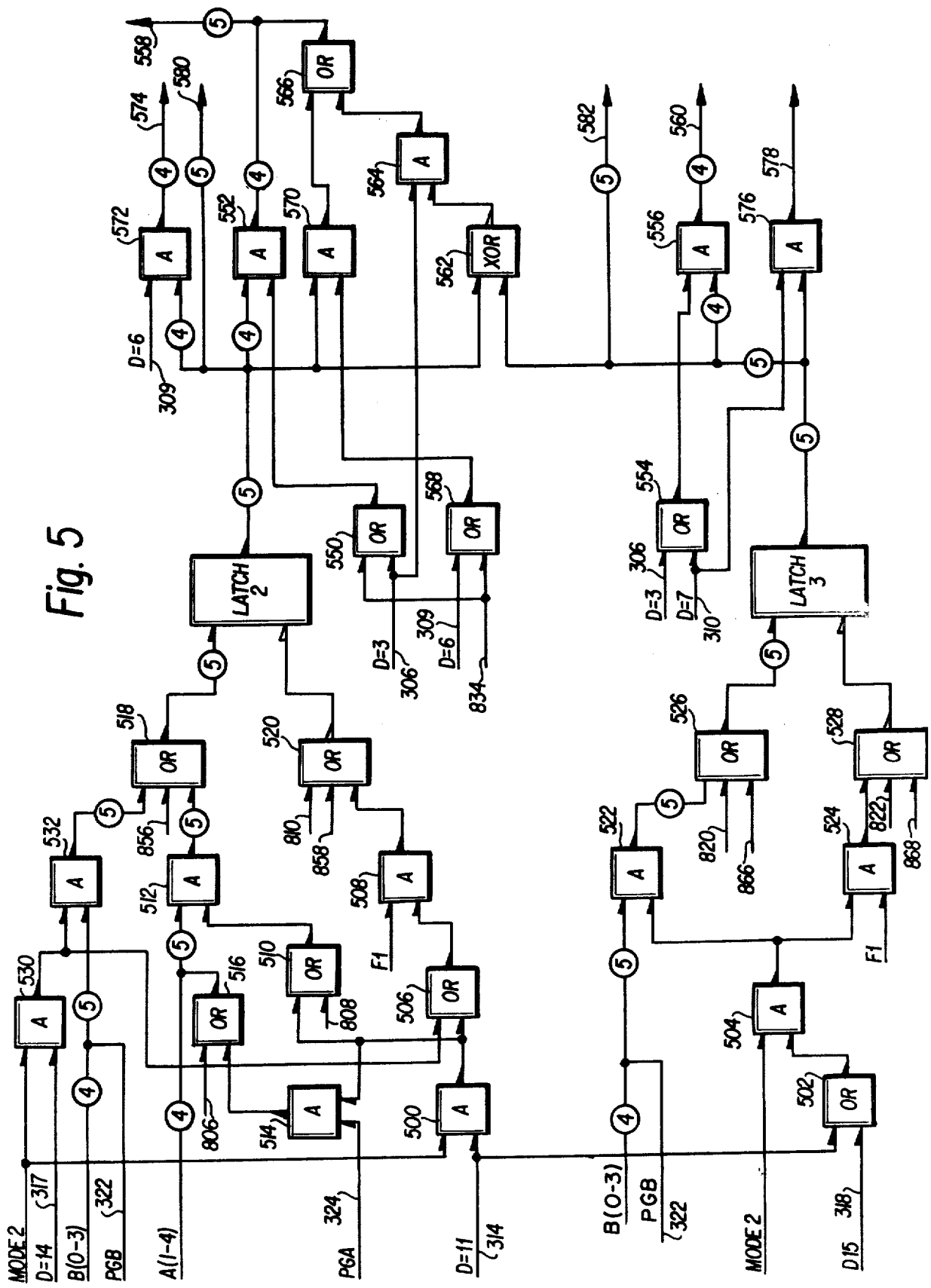
FIG. 5 shows Latch 2 and Latch 3 and the input and output circuits for these latches utilized during mode 2.

The four latches utilized for storing the index fields for indirect addressing are designated Latch 0-Latch 3. Latch 0 and Latch 1 are shown in FIG. 4 and Latch 2 and Latch 3 are shown in FIG. 5. Each of these latches is a five position latch for storing four data bits plus a parity bit. The latch positions are designated LX0-LX4 where X is the latch number.

In Mode 2 the A and B Buses may be concatenated to form a 9-bit bidirectional data bus A/B for either loading or accessing the page and index latches. The format of the 9-bit bidirectional data bus A/B is as follows, where MSB and LSB represent the most and least significant bits, respectively.

| A0 | A1  | A2 | A3 | A4 | B0 | B1 | B2 | B3  |
|----|-----|----|----|----|----|----|----|-----|
| P  | MSB | —  | —  | —  | —  | —  | —  | LSB |

Bit B4 is utilized as a signal to represent a parity error during the loading of the page or index latches.

In Mode 2, four bits of the D Bus (D0–D3) may be utilized to apply signals to the MFN to select one of 14 possible operations. Seven of these operations are for loading various ones of the page and index latches and the other seven operations are for accessing the latches. When the bits D0–D3 have either the value 0000 or 1000 no operation is performed. Bit D4 functions as a control input for controlling the loading of a Stack Address Register (SAR).

Bit positions F1, F2 and F3 of the F Bus have specialized functions during Mode 2. F1 is used as a clocking signal for the majority of the Mode 2 clocking. F2 is used as a control signal to select either the C or E Bus as an input. F3 is utilized as an output signal to indicate that the contents of a selected index register are zero when generating an indirect address.

Page and Index Register Loading

Table V shows which page and index registers are loaded for each value appearing on the D Bus. D0–D3 must have a value between D=9 and D=15 (i.e. D0=1) in order to load any of the latches. Table V shows that for $D=9_H$ A Bus bits A1–A4 are loaded into LA1–LA4 and B Bus bits B0–B3 are loaded into LB1–LB4. During the loading operation two parity bits designated PGA and PGB are generated and loaded into LA0 and LB0. The parity bit A0 received from the bus is not stored in any of the latches but is utilized for parity checking the information being loaded into the latches.

TABLE V

| | | | | PAGE AND INDEX REGISTER LOADING | | | | | | | | | |
|---|---|---|---|---|---|---|---|---|---|---|---|---|---|
| D0 | D1 | D2 | D3 | A0 PGA | A1 | A2 | A3 | A4 | PGB | B0 | B1 | B2 | B3 |
| 1 | 0 | 0 | 0 | | | | | | | | | | |
| 1 | 0 | 0 | 1 | P LA0 | LA1 | LA2 | LA3 | LA4 | LB0 | LB1 | LB2 | LB3 | LB4 |
| 1 | 0 | 1 | 0 | P L00 | L01 | L02 | L03 | L04 | L10 | L11 | L12 | L13 | L14 |
| 1 | 0 | 1 | 1 | P L20 | L21 | L22 | L23 | L24 | L30 | L31 | L32 | L33 | L34 |
| 1 | 1 | 0 | 0 | P — | — | — | — | — | L00 | L01 | L02 | L03 | L04 |
| 1 | 1 | 0 | 1 | P — | — | — | — | — | L10 | L11 | L12 | L13 | L14 |
| 1 | 1 | 1 | 0 | P — | — | — | — | — | L20 | L21 | L22 | L23 | L24 |
| 1 | 1 | 1 | 1 | P — | — | — | — | — | L30 | L31 | L32 | L33 | L34 |

Table V further shows that if bits D0–D3 have the value 1010 (D=$10_H$) then the value appearing on the A/B Bus is loaded into latches 0 and 1. If the bits D0–D3 have the value D=$11_H$, then latches 2 and 3 are loaded from the A/B Bus. If D0–D3 has a value of $12_H$, $13_H$, $14_H$, or $15_H$, then only a single latch L0, L1, L2 or L3, respectively is loaded, the information being loaded into the latch from the B Bus.

Referring to FIG. 3, the signal Mode 2 from decoder 117 is inverted by a buffer 300 and applied as an enabling signal to a decoder 302. The signals D0–D3 are applied to the decoder 302 to generate one of the signals D=1 through D=15 on leads 304–318. The signals D=1 through D=15 are distributed to FIGS. 4, 5, and 6 to control the loading or accessing of the page and index registers. FIG. 3 also shows the circuits for checking parity and generating the parity bits PGA and PGB. Bits B0–B3, derived from the B Bus receivers 102, are applied to a parity generator 320 which produces a low level signal PGB on lead 322 if the number of "ones" in B0–B3 is odd. The output of parity generator 320 is applied to a further parity generator 321 which receives A0–A4 from the A Bus receivers 100. Parity generator 321 generates a low level parity signal PPA on lead 324 if the number of "ones" in A1–A4 is odd. In addition, parity generator 321 generates the signal Parity Error which is low if the number of ones in A0–A4 and B0–B3 is even. If the signal Parity Error is low, it indicates an error in the data on the A/B Bus and enables an AND 328. This AND is further enabled only when the MFN is operating in Mode 2, the value on the D Bus has a value between D=$9_H$ and D=$15_H$, and F1 occurs. The Mode 2 signal is inverted at buffer 300 to produce the signal L Mode 2 to enable one input of AND 330. The signal D=8, derived from decoder 302 over lead 311 is low and enables a second input of AND 330. The signal D0, derived from the D Bus receivers 106, is passed through inverting buffer 332 and enables a further input of AND 330. Finally, upon occurrence of F1, the signal is inverted at buffer 334 and passes through AND 330 to enable AND 328. If there is a parity error, AND 328 produces a signal on lead 336 which is applied through one of the ORs 154 to the driver 103 which drives the B4 lead of the B Bus. This parity check is made each time a page or index latch is loaded, i.e. when a value is on the A/B Bus and the D Bus value is between 1001 and 1111.

Figure 6:
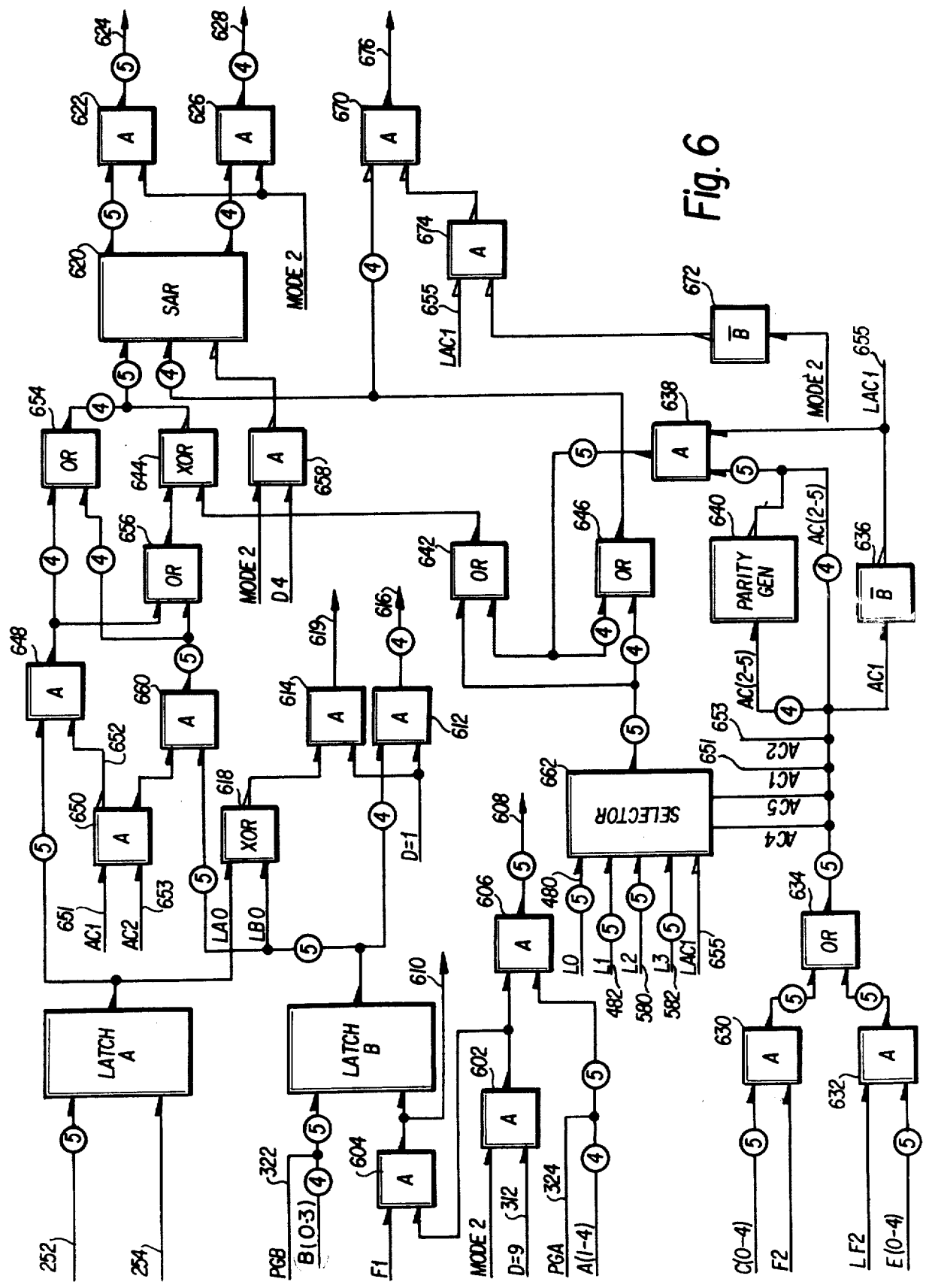
FIG. 6 shows the storage address register, Latch A and Latch B, and the circuits for generating stack addresses when the chip is operating in mode 2.

When bits D0–D3 have the value 1001, decoder 302 produces the signal D=9 on lead 312 which is connected to an AND 602. AND 602 is further enabled by the signal Mode 2 and produces an output signal to enable an AND 604 and a set of ANDs 606. ANDs 606 receive signals A1–A4 derived from the A Bus through receivers 100 as well as the parity bit PGA, generated as described above. The outputs from ANDs 606 are applied over Bus 608 and through ORs 214 to the data inputs of Latch A. It will be understood that Latches A shown in FIGS. 2 and 6 are the same latch.

The data applied to Latch A is gated into the latch on a low-to-high transition of F1. F1 is applied to AND 604 and the resulting output signal from AND 604 is passed over a lead 610 and through OR 216 to the enable input of Latch A.

The output of AND 604 also enables Latch B (FIG. 6) so that the generated parity bit PGB and bits B0–B3 are stored in the Latch B at the same time Latch A is loaded. Bits B0–B3 are obtained from the outputs of receivers 102.

When D0–D3=1010, decoder 302 produces the signal D=$10_H$ on lead 313 to cause the value on the A/B Bus to be loaded into Latches 0 and 1. In FIG. 4, the signal D=$10_H$ is applied to an AND 400 and through an OR 402 to an AND 404. ANDs 400 and 404 are further enabled by the signal Mode 2.

The output of AND 400 is connected to one input of an AND 406 and through an OR 408 to the enabling inputs of a set of ANDs 410. Four of the ANDs 410 receive the signals A1–A4 from the A Bus receivers 100. The other AND 410 receives the output of an OR 412 which is connected to the output of AND 406. The parity bit PGA is applied to AND 406 and thus is gated through one of the ANDs 410 together with the four bits from the A Bus. The outputs from ANDs 410 are applied through a set of ORs 412 to the data inputs of Latch 0.

The output of AND 400 also enables an AND 414 which receives the signal F1. On the low-to-high transition of F1, AND 414 produces an output signal that is inverted by an OR 416 and applied to the enabling input of Latch 0. The input data to Latch 0 is available at the latch outputs as long as F1 is true. On the high-to-low transition of F1 the data is stored in the latch.

At the same time, bits B0–B3 are stored in Latch 1 together with the generated parity bit PGB. Bits B0–B3 and PGB are applied to a set of five ANDs 418. The output of AND 404 enables ANDs 418 as well as a single AND 420. B0–B3 and PGB are gated through ANDs 418 and a set of ORs 422 to the data inputs of Latch 1. When F1 occurs, it is applied through AND 420 and an OR 424 to the enabling input of Latch 1. As long as F1 is true the data inputs of Latches 0 and 1 are enabled and the outputs reflect the inputs. The inputs are latched to store the data on the high-to-low transition of F1.

As shown in Table V, when D0–D3=1011, the value on the A/B Bus is stored in Latches 2 and 3. Decoder 302 generates the signal D=$11_H$ on lead 314. In FIG. 5, this signal is applied to an AND 500 and through an OR 502 to an AND 504. ANDs 500 and 504 are further enabled by the signal Mode 2. The output of AND 500 is passed through an OR 506 to one input of an AND 508, ahd through an OR 510 to the enabling inputs of a set of ANDs 512. In addition, the output of AND 500 enables an AND 514. PGA is applied through AND 514 and an OR 516 to one of the ANDs 512. At the same time, bits A1-A4 are applied to the other ANDs 512. The outputs of ANDs 512 are passed through a set of ORs 518 to the data inputs of Latch 2. The signal F1 is applied to AND 508, now enabled, and passes through an OR 520 to enable Latch 2. The signals at the data inputs of Latch 2 are available at the latch outputs immediately upon occurrence of F1 and the data is latched into Latch 2 on the high-to-low transition of F1.

At the time Latch 2 is loaded, Latch 3 is loaded with the contents of the B Bus. In FIG. 5, PGB and bits B0-B3 are applied to a set of ANDs 522. The output of AND 504 enables ANDs 522 as well as an AND 524. PGB and (B0-B3) are gated through ANDs 522 and a set of ORs 526 to the data inputs of Latch 3. Upon occurrence of the signal F1, the output from AND 524 is gated through an OR 528 to the enabling input of Latch 3 thereby making the signals at the data inputs of the latch available at its outputs. The data is stored in Latch 3 on the high-to-low transition of F1.

All of the foregoing Mode 2 latch loading operations have involved the simultaneous loading of two latches from the concatenated A/B Bus. However, it is possible to load one of the Latches L0-L3 from the B Bus without loading any latch from the A Bus. As shown in Table V, this still requires the use of the A and B Buses in a concatenated configuration because the parity bit from A0 must be checked.

When D0-D3 = 1100, the value on the B Bus is stored in Latch 0. Decoder 302 produces the signal D=12 which is applied to an AND 430 together with the signal Mode 2. The output of AND 430 enables a set of ANDs 432 and an AND 434. B0-B3 from the bus receivers 102 and PGB are applied through ANDs 432, now enabled, and ORs 412 to the data inputs of Latch 0. The signal F1 is applied to AND 434, now enabled, and the output of AND 434 passes through OR 416 to the enabling input of Latch 0. This completes the storage of the data from the B Bus in Latch 0. It should be noted that the A and B Bus contents are applied to the parity generators 320 and 321 as in the latch loading operations described above.

When D0-D3 have the value 1101, the contents of the B Bus are loaded into Latch 1. Decoder 302 generates the signal D=13. In FIG. 4, D=13 is passed through OR 402 and AND 404 to enable the AND 420 and the set of ANDs 418. Bits B0-B3 from bus receivers 102 and PGB from parity generator 320 are applied to ANDs 418. The outputs of ANDs 418 are then passed through ORs 422 to the data inputs of Latch 1. Upon occurrence of the signal F1 the output of AND 420 is passed through OR 424 to enable Latch 1 and permit entry of the data.

When D0-D3 have the value 1110, the value on the B Bus is stored in Latch 2. Decoder 302 generates the signal D=14. In FIG. 5, this signal is applied to an AND 530 which is enabled by the Mode 2 signal. The output of AND 530 enables a set of ANDs 532 and through OR 506 enables AND 508. PGB is applied along with bits B0-B3 to the ANDs 532. The outputs from ANDs 532 are passed through ORs 518 to the data inputs of Latch 2. The clocking signal F1 is passed through AND 508 and OR 520 to enable Latch 2.

When D0-D3 have the value 1111, the value on the B Bus is stored in Latch 3. Decoder 302 generates the signal D=15. In FIG. 5, this signal passes through OR 502 and AND 504 to enable ANDs 522 and 524. PGB and bits B0-B3 are gated through ANDs 522 and ORs 526 to the data inputs of Latch 3. Upon occurrence of the signal F1, it is gated through AND 524 and OR 528 to the enable input of Latch 3 thereby enabling the data from the B Bus to be entered into the latch and latched therein on the subsequent high-to-low transition of F1.

Accessing Page and Index Registers

The contents of the two page registers (Latch A and Latch B) or the contents of one or two of the four index registers (Latch 0, 1, 2 or 3) can be placed on the 9-bit bidirectional data bus A/B with the selection being determined by a value on the D Bus. Table VI summarizes the page and index latch selection in accordance with the values on the D Bus.

TABLE VI

| PAGE AND INDEX REGISTER ACCESSING | | | | | | | | | | | | |
|---|---|---|---|---|---|---|---|---|---|---|---|---|
| D0 | D1 | D2 | D3 | A0 | A1 | A2 | A3 | A4 | B0 | B1 | B2 | B3 |
| 0 | 0 | 0 | 0 | 0 | 0 | 0 | 0 | 0 | 0 | 0 | 0 | 0 |
| 0 | 0 | 0 | 1 | P | LA1 | LA2 | LA3 | LA4 | LB1 | LB2 | LB3 | LB4 |
| 0 | 0 | 1 | 0 | P | L01 | L02 | L03 | L04 | L11 | L12 | L13 | L14 |
| 0 | 0 | 1 | 1 | P | L21 | L22 | L23 | L24 | L31 | L32 | L33 | L34 |
| 0 | 1 | 0 | 0 | P | 0 | 0 | 0 | 0 | L01 | L02 | L03 | L04 |
| 0 | 1 | 0 | 1 | P | 0 | 0 | 0 | 0 | L11 | L12 | L13 | L14 |
| 0 | 1 | 1 | 0 | P | 0 | 0 | 0 | 0 | L21 | L22 | L23 | L24 |
| 0 | 1 | 1 | 1 | P | 0 | 0 | 0 | 0 | L31 | L32 | L33 | L34 |

A0* = Odd Parity of A1-A4 and B0-B3.

As shown in Table VI, bit D0 must be a 0 in order to access any of the page or index latches. In FIG. 3, this causes the output of buffer 332 to block AND 330 which in turn blocks AND 328 to prevent the generation of a parity error signal. Also, as shown in Table VI when D0-D3 have the value 0000 there is no output from any of the page or index latches to the A and B Buses.

When D0-D3 have the value 0001, the contents of Latches A and B are gated onto the A/B Bus. The decoder 302 generates the signal D=1 which is applied through OR 218 to enable ANDs 220. The ANDs 220 receive the output of Latch A, bit positions LA1-LA4. The outputs from ANDs 220 pass through ORs 152 to the drivers 101 which drive A Bus positions A1-A4.

The signal D1 is also applied to a set of four ANDs 612 and a single AND 614. ANDs 612 are connected to positions 1-4 of Latch B so that when the signal D=1 is true the contents of LB1-LB4 are gated over Bus 616 and through ORs 154 to the drivers 103 which drive B Bus positions B0-B3.

The parity of the value placed on the A/B Bus is determined by taking the Exclusive OR of the parity bits stored in Latches A and B. These parity bits are stored in positions LA0 and LB0 and are applied to XOR 618 which produces a high level output signal to enable AND 614 only when parity bits LA0 and LB0 are equal (i.e. both zero or both one). The parity bit derived from AND 614 is applied over lead 619, through OR 221, over Bus 222, through an OR 152, to the driver 101 which drives position A0 of the A Bus.

When bits D0-D3 have the value 0010, the contents of Latches 0 and 1 may be read onto the A/B Bus. Decoder 302 generates the signal D=2. In FIG. 4, D=2 is applied through an OR 450 to one input of a set of ANDs 452, and through an OR 454 to a set of ANDs 456. ANDs 452 receive the output signals from Latch 0, bit positions 1-4 so upon occurrence of D=2, the contents of L01-L04 are gated over bus 458, through ORs 152 to the drivers 101 for driving positions A1-A4 of the A Bus. At the same time, D=2 gates the contents of L11-L14 through ANDs 456, over bus 460 and through ORs 154 to the drivers 103 which drive positions B0-B3 of the B Bus.

Parity bit positions L00 and L10 are applied to an XOR 462, which produces a high level output signal only if L00=L10. XOR 462 has an output connected to an AND 464. When the parity bits in the two latches are the same, the output of XOR 462 enables AND 464 so that upon occurrence of the signal D=2 AND 464 produces an output signal that passes through OR 466, over bus 458, through an OR 152 to the driver 101 to drive position A0 on the A Bus.

When D0-D3 have the value 0011, the contents of Latches 2 and 3 are read out to the A/B Bus. Decoder 302 produces the signal D=3. In FIG. 5, D=3 is applied through an OR 550 to a set of ANDs 552 and through an OR 554 to a set of ANDs 556. ANDs 552 receive the outputs from Latch 2, bit positions 1-4. Upon occurrence of D=3, the signals L21-L24 are gated through ANDs 552, over bus 558 and through ORs 152 to the drivers 101 for driving the A Bus positions A1-A4.

ANDs 556 receive the outputs from Latch 3, positions 1-4 so upon occurrence of the signal D=3, the signals L31-L34 pass through ANDs 556, over bus 560, through ORs 154 to the drivers 103 for driving the B Bus positions B0-B3.

The parity of the value applied to the A/B Bus is determined by taking the Exclusive NOR of the parity bit positions L20 and L30. L20 and L30 are applied to inputs of an XOR 562. If L20 and L30 are equal (both zero or both one) the output of XOR 562 enables an AND 564 which further receives the signal D=3. The output of AND 564 is passed through OR 566 to the bus 558 from whence it passes through an OR 152 to the driver 101 for driving the A Bus parity position A0.

When D0-D3 have the value 0100, the contents of Latch 0 only are placed on the A/B Bus. The decoder 302 produces the signal D=4. In FIG. 4, D=4 passes through an OR 467 and enables one input of an AND 468. This AND receives the parity bit L00 from Latch 0. The signal D=4 is also applied to a set of ANDs 470 which receive the outputs from L01-L04. Thus, when the signal D=4 occurs the parity bit passes from AND 468, through OR 466, over bus 458, through an OR 152 to the driver 101 for driving the A0 position of Bus A. At the same time, the outputs from ANDs 470 Pass over bus 472 and through ORs 154 to the drivers 103 for driving positions B0-B3 of the B Bus. Since there is no gating onto the A Bus, positions A1-A4, these positions all carry a logical zero.

When D0-D3 have the value 0101, the contents of Latch 1 are placed on the A/B Bus. The decoder 302 generates the signal D=5. In FIG. 4 this signal is passed through OR 454 to enable the set of ANDs 456 to thereby gate the contents L11-L14 to the B Bus, positions B0-B3. The signal D=5 is also applied to an AND 474 which also receives the parity bit from L10. Upon occurrence of the signal D=5 the parity bit is gated through AND 474, over a lead 476, through an OR 152, to drive the driver 101 for the A Bus position A0. Again, there is no gating to drive positions A1-A4 hence each of these positions effectively carries a binary zero.

When D0-D3=0110, the contents of Latch 2 are placed on the A/B Bus. Decoder 302 produces the signal D=6. In FIG. 5, D=6 is passed through an OR 568 to enable an AND 570. In addition, D=6 enables a set of four ANDs 572. AND 570 has a second input connected to the parity bit position L20 of Latch 2 so upon occurrence of D=6 the parity bit is passed through AND 570 and OR 566 to drive position A0 of the A/B Bus as previously described. At the same time, the contents of L21-L24, are gated through ANDs 572, over bus 574 and through ORs 154 to the drivers 103 for driving positions B0-B3 of the A/B Bus. There is no gating to the A Bus, positions 1-4 so each of these positions carries a logical zero.

When D0-D3 have a value 0111, the contents of Latch 3 are placed on the A/B Bus. The decoder 302 generates the signal D=7. In FIG. 5, D=7 is applied to an AND 576 and through OR 554 to a set of ANDs 556. AND 576 is connected to the parity bit position L30 hence upon occurrence of D=7 the parity bit is gated through AND 576, over lead 578 and through an OR 152 to the driver 101 for driving bit position A0 of the A/B Bus. ANDs 556 are connected to L31-L34 so upon occurrence of D=7 the contents of Latch 3 positions 1-4 are gated through ANDs 556, over Bus 560, and through ORs 154 to the drivers 103 for driving positions B0-B3 of the A/B Bus. Again, a logical zero is placed on the A Bus in positions A1-A4 since there is no output gating from the latches to these positions.

Direct Addressing

When the MFN chip is operated in Mode 2 for direct stack addressing, addresses having the format shown in FIG. 10A are loaded into a stack address register (SAR) 620. A four bit constant field is derived from either the C Bus or the E Bus and loaded into the low order positions SAR5-SAR8. At the same time, the four bit value stored in LA1-LA4 is entered into SAR1-SAR4. A parity bit is generated from the parities of the value on Bus C or Bus E and the parity stored in LA0, and the resulting parity is entered into SAR0.

As shown in Table VII, the contents of SAR 620 are applied to the F Bus, positions F4-F12. The outputs of SAR0-SAR4 are applied to a set of ANDs 622 having their outputs connected by a bus 624 to ORs 178. The outputs of ORs 178 drive the drivers 111 for the F Bus, positions F4-F8. The outputs from SAR5-SAR8 are applied to a set of ANDs 626 which have their outputs connected by a bus 628 to four of the ORs 180. The outputs from ORs 180 are connected to the drivers 113 which drive the F Bus, positions F9-F12.

TABLE VII

DIRECT ADDRESSING

| Address Control | | | | | Address Output | | | | | | | | |
|---|---|---|---|---|---|---|---|---|---|---|---|---|---|
| 1 | 2 | 3 | 4 | 5 | F4 | F5 | F6 | F7 | F8 | F9 | F10 | F11 | F12 |
| 0 | 0 | 0 | 0 | 0 | P | LA1 | LA2 | LA3 | LA4 | 0 | 0 | 0 | 0 |
| 0 | 0 | 0 | 0 | 1 | P | " | " | " | " | 0 | 0 | 0 | 1 |
| 0 | 0 | 0 | 1 | 0 | P | " | " | " | " | 0 | 0 | 1 | 0 |
| 0 | 0 | 0 | 1 | 1 | P | " | " | " | " | 0 | 0 | 1 | 1 |
| 0 | 0 | 1 | 0 | 0 | P | " | " | " | " | 0 | 1 | 0 | 0 |
| 0 | 0 | 1 | 0 | 1 | P | " | " | " | " | 0 | 1 | 0 | 1 |
| 0 | 0 | 1 | 1 | 0 | P | " | " | " | " | 0 | 1 | 1 | 0 |
| 0 | 0 | 1 | 1 | 1 | P | " | " | " | " | 0 | 1 | 1 | 1 |
| 0 | 1 | 0 | 0 | 0 | P | " | " | " | " | 1 | 0 | 0 | 0 |
| 0 | 1 | 0 | 0 | 1 | P | " | " | " | " | 1 | 0 | 0 | 1 |
| 0 | 1 | 0 | 1 | 0 | P | " | " | " | " | 1 | 0 | 1 | 0 |
| 0 | 1 | 0 | 1 | 1 | P | " | " | " | " | 1 | 0 | 1 | 1 |
| 0 | 1 | 1 | 0 | 0 | P | " | " | " | " | 1 | 1 | 0 | 0 |
| 0 | 1 | 1 | 0 | 1 | P | " | " | " | " | 1 | 1 | 0 | 1 |
| 0 | 1 | 1 | 1 | 0 | P | " | " | " | " | 1 | 1 | 1 | 0 |
| 0 | 1 | 1 | 1 | 1 | P | " | " | " | " | 1 | 1 | 1 | 1 |

The constant field of a direct address is derived from the C Bus or E Bus as follows. The outputs from the C Bus receivers 104 are connected to a set of ANDs 630 while the outputs of the E Bus receivers 108 are connected to a set of ANDs 632. The signal F2 is applied to ANDs 630 and through an inverting buffer 121 to ANDs 632. Thus, when F2 is true the value on the C Bus is gated through ANDs 630 and when F2 is false the value on the E Bus is gated through ANDs 632. The outputs of ANDS 630 and 632 are applied to a set of ORs 634 and the outputs from ORs 634 are defined as the address control signals AC1-AC5.

As shown in Table VII, for direct addressing the address control bit AC1 must be a zero. The AC1 signal is passed through an inverting buffer 636 and applied to a set of five ANDs 638. Signals AC2-AC5 are applied directly to the second inputs of four of the ANDs 638. In addition, the signals AC2-AC5 are applied to a parity generator 640 which generates a parity bit that is appied to the fifth AND 638. The parity bit from one AND 638 is applied through an OR 642 to an XOR 644 while the bits AC2-AC5 from ANDs 638 are passed through a set of ORs 646 to SAR5-SAR8.

The page field of a direct address is obtained from Latch A. The contents of Latch A are applied to a set of ANDs 648. An AND 650 receives the signals AC1 and AC2 from ORs 634. As shown in Table VII, AC1=0 for direct addressing. When AC1=0 AND 650 produces a high level signal on lead 652 to enable ANDs 648 and pass the contents of Latch A. Bits LA1-LA4 are applied through a set of ORs 654 to SAR1-SAR4. The parity bit LA0 is applied through an OR 656 to XOR 644. XOR 644 in effect compares the parity bit LA0 with the parity bit derived from AC2-AC5 and produces a high level output signal if the two parities are equal. The resulting output from XOR 644 is stored in SAR0.

The address is entered into SAR 620 by an output signal from an AND 658. AND 658 has one input which is enabled throughout Mode 2 and a second input which is derived from the D Bus receiver 106 connected to the D4 position of the D Bus. Thus, D4 serves as the clocking pulse for loading SAR 620 and making its contents available on the F Bus.

Indirect Addressing

As illustrated in FIG. 10B, an indirect address comprises a parity bit, a 4-bit page field, and a 4-bit index field. The page field is derived from Latch A or Latch B and the index field is derived from Latch 0, Latch 1, Latch 2 or Latch 3. The sources for an indirect address are determined by the address control bits AC1-AC5 which are derived from either the C or E Bus as prevoiusly explained. For indirect addressing, the address control bits AC1-AC5 do not form part of the address but are instead used to control the selection of registers which store values which are used in forming the address. Table VIII shows the sources for the page and index fields for given values of the address control bits.

TABLE VIII

INDIRECT ADDRESSING

| Address | | | | | Zero Sum | Address Output | | | | | | | | |
|---|---|---|---|---|---|---|---|---|---|---|---|---|---|---|
| 1 | 2 | 3 | 4 | 5 | F3 = 1 if | F4 | F5 | F6 | F7 | F8 | F9 | F10 | F11 | F12 |
| 1 | 0 | 0 | 0 | 0 | (L0) = 0 | P | LA1 | LA2 | LA3 | LA4 | L01 | L02 | L03 | L04 |
| 1 | 0 | 0 | 0 | 1 | (L1) = 0 | P | " | " | " | " | L11 | L12 | L13 | L14 |
| 1 | 0 | 0 | 1 | 0 | (L2) = 0 | P | " | " | " | " | L21 | L22 | L23 | L24 |
| 1 | 0 | 0 | 1 | 1 | (L3) = 0 | P | " | " | " | " | L31 | L32 | L33 | L34 |
| 1 | 0 | 1 | 0 | 0 | (L0) = 0 | P | " | " | " | " | L01 | L02 | L03 | L04 |
| 1 | 0 | 1 | 0 | 1 | (L1) = 0 | P | " | " | " | " | L11 | L12 | L13 | L14 |
| 1 | 0 | 1 | 1 | 0 | (L2) = 0 | P | " | " | " | " | L21 | L22 | L23 | L24 |
| 1 | 0 | 1 | 1 | 1 | (L3) = 0 | P | " | " | " | " | L31 | L32 | L33 | L34 |
| 1 | 1 | 0 | 0 | 0 | (L0) = 0 | P | LB1 | LB2 | LB3 | LB4 | L01 | L02 | L03 | L04 |
| 1 | 1 | 0 | 0 | 1 | (L1) = 0 | P | " | " | " | " | L11 | L12 | L13 | L14 |
| 1 | 1 | 0 | 1 | 0 | (L2) = 0 | P | " | " | " | " | L21 | L22 | L23 | L24 |
| 1 | 1 | 0 | 1 | 1 | (L3) = 0 | P | " | " | " | " | L31 | L32 | L33 | L34 |
| 1 | 1 | 1 | 0 | 0 | (L0) = 0 | P | " | " | " | " | L01 | L02 | L03 | L04 |
| 1 | 1 | 1 | 0 | 1 | (L1) = 0 | P | " | " | " | " | L11 | L12 | L13 | L14 |
| 1 | 1 | 1 | 1 | 0 | (L2) = 0 | P | " | " | " | " | L21 | L22 | L23 | L24 |

TABLE VIII-continued

| INDIRECT ADDRESSING | | | | | | | | | | | | |
|---|---|---|---|---|---|---|---|---|---|---|---|---|
| Address | | | | | Zero Sum | Address Output | | | | | | |
| 1 | 2 | 3 | 4 | 5 | F3 = 1 if | F4 | F5 | F6 | F7 | F8 | F9 | F10 | F11 | F12 |
| 1 | 1 | 1 | 1 | 1 | (L3) = 0 | P | " | " | " | " | L31 | L32 | L33 | L34 |

(Ln) = contents of Latch n

Address control bits AC1 and AC2 control the selection of Latch A or Latch B as the source of the page field. For indirect addressing AC1=1. If AC2=0 and 650 produces an output signal to enable ANDs 648 to thereby read out the contents of Latch A to SAR 620 as previously described. If AC1 and AC2 are both true, AND 650 produces an output signal to enable a set of ANDS 660. These ANDs are connected to the five storage positions of Latch B. From ANDs 660, the parity bit LB0 is connected through OR 656 to XOR 644 while LB1-LB4 are connected from ANDs 660 through ORs 654 to SAR1-SAR4.

As with direct addressing, the parity bit entered into SAR0 is determined by taking the Exclusive NOR of the parity bits of the selected page register and selected index register.

Address control bits AC4 and AC5 select one of the Latches L0-L3 as the source of the index field for the indirect address. AC4 and AC5 are applied to a selector 662 which receives the outputs from all of the Latches L0-L3. Since AC1=1, the output of buffer 636 is at the low level and the signal LAC1 is applied to the enabling input of selector 662. Depending upon the combination of bits AC4 and AC5, selector 662 produces at its output the signals representing the contents of one of the latches L0-L3. The parity bit position is connected through 642 to XOR 644 while the other four positions are connected through the set of ORs 646 to SAR-5-SAR8.

If the contents of the selected index register are zero, a one bit is placed on the F Bus, position F3. The outputs from ORs 646 are applied to a single AND 670. The Mode 2 signal is inverted by buffer 672 and applied to one input of an AND 674. AND 674 also receives the signal LAC1 which is low for indirect addressing. AND 674 produces a low level output signal to enable AND 670. Thus, if the contents of the selected index register L0-L3 are zero AND 670 produces a true output signal on lead 676. Lead 676 is connected through OR 244 to the driver 113 which drives position F3 of the F Bus.

MODE 3

When the mode control bits M1M2=11, the MFN functions as a multiport file. In this mode the four latches L0-L3 are each assigned a dedicated bus from which the latch may be loaded or which the latch may drive. In addition, each of the latches may drive a common bus. The assignment of the latches and buses is as follows.

| Latch | Dedicated Bus | Common Bus |
|---|---|---|
| 0 | B | A |
| 1 | C | A |
| 2 | D | A |
| 3 | E | A |

A latch may simultaneously drive both its dedicated bus and the common A Bus. However, unpredictable results are obtained if an attempt is made to load a latch simultaneously from both its dedicated bus and the A Bus.

The F Bus provides the primary controls or selection signals during Mode 3. Bits F1 and F2 select one of the four latches to drive or be loaded from the A Bus as follows.

| F1 | F2 | |
|---|---|---|
| 0 | 0 | Select Latch 0 |
| 0 | 1 | Select Latch 1 |
| 1 | 0 | Select Latch 2 |
| 1 | 1 | Select Latch 3 |

F3 gates the information on the A Bus into the latch selected by F1 and F2.

Figure 7:
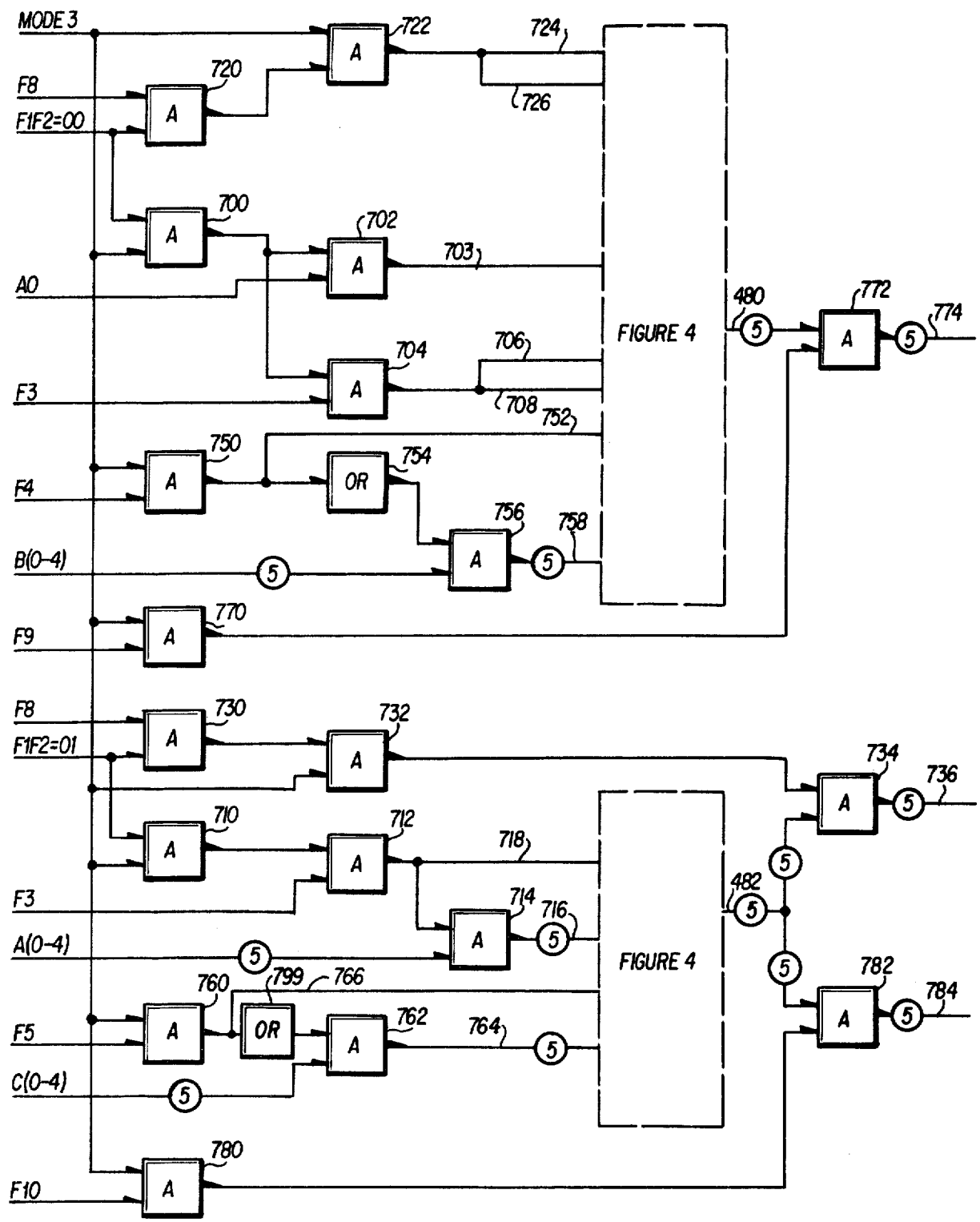
FIG. 7 shows the input and output circuits for Latch 0 and Latch 1 when the chip is operating in mode 3.

The circuits for controlling L0 and L1 during Mode 3 are shown in FIG. 7. The signal Mode 3 is derived from the mode decode circuit 117 for the duration of the chip enable signal when M1M2=11. The decoder 118 receives the signals F1 and F2 and, depending upon the values of these signals produces one of the signals F1F2=00, F1F2=01, F1F2=10 or F1F2=11. In FIG. 7, the signals Mode 3 and F1F2=00 are applied to an AND 700 which has its output connected to two ANDs 702 and 704. AND 702 is further enabled by the output of the receiver 100 which receives the parity bit A0 from the A Bus. The parity bit A0 passes through AND 702 and OR 499 and is applied to ANDs 410 along with bits A1-A4.

When F3 goes true it enables AND 704. The resulting output from AND 704 is applied over lead 706 and through OR 408 to enable the ANDs 410. Thus, the contents of the A Bus are passed through ANDs 410 and ORs 412 to the data in uts of Latch 0. The output of AND 704 is also applied over lead 708 and through OR 416 to the enable input of Latch 0. This enables the contents of the A Bus applied to the data inputs of Latch 0 to be made available at the output of the latch. The contents of the latch will follow the A Bus data as long as F3 is high. The data is retained in Latch 0 on the high-to-low transition of F3.

Latch 1 is loaded from the A Bus during Mode 3 when F1F2=01 and F3 is true. The signals Mode 3 and F1F2=01 are applied to an AND 710 having its output connected to an AND 712. AND 712 is further enabled by F3 and produces an output signal that enables a set of ANDs 714. The ANDs 714 receive bits A0-A4 derived from the A Bus through the receivers 100. The outputs from ANDs 714 are applied over bus 716 and through ORs 422 to the data inputs of Latch 1. The output of AND 712 is applied by way of lead 718 and OR 424 to the enabling input of Latch 1 thereby enabling the contents of the A Bus to be stored therein.

Figure 8:
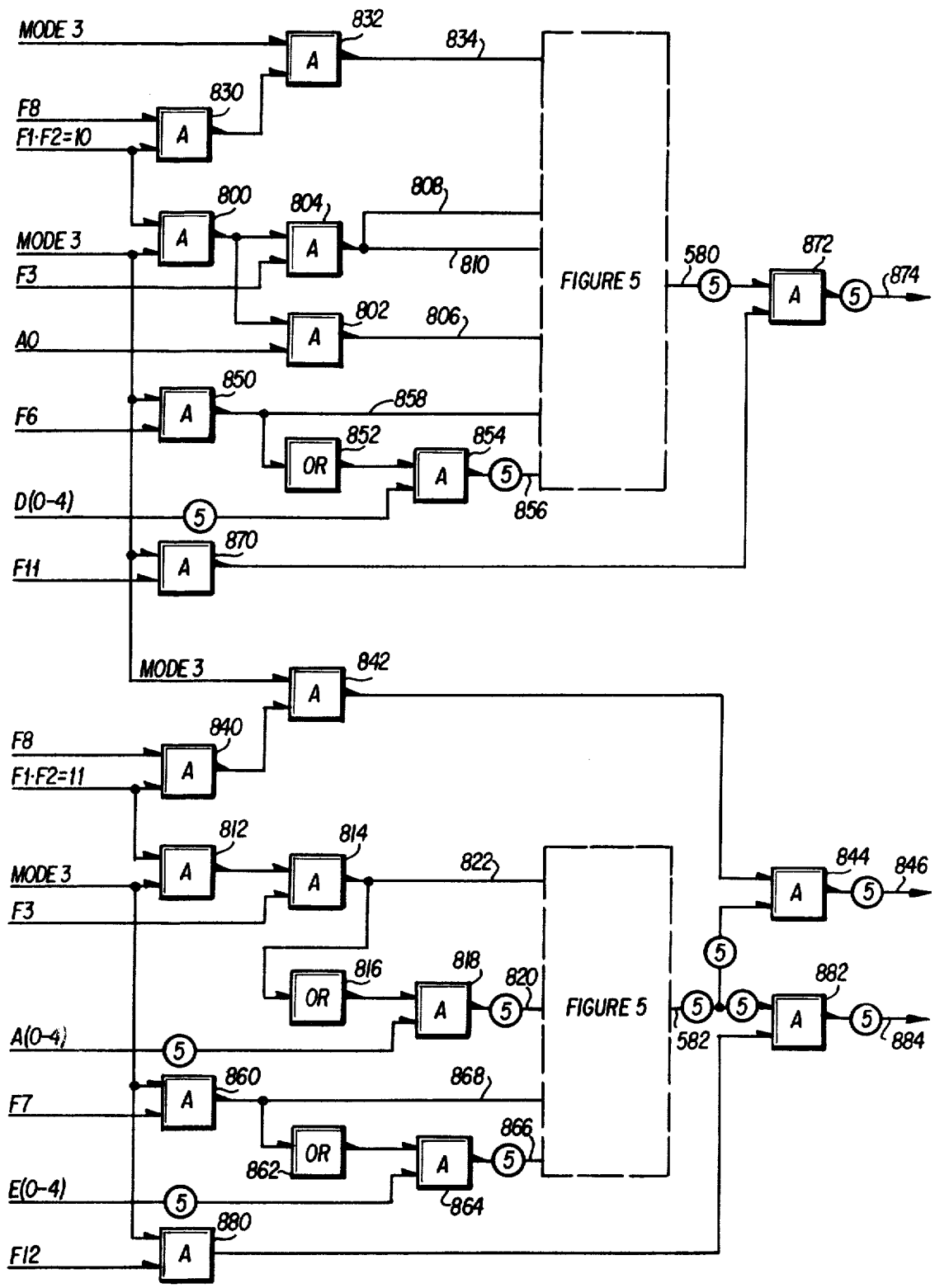
FIG. 8 shows the input and output circuits for Latch 2 and Latch 3 when the chip is operating in mode 3.

During Mode 3 the contents of the A Bus are loaded into Latch 2 if F1F2=10 when F3 goes true. In FIG. 8, the signals Mode 3 and F1F2=10 enable an AND 800 having an output connected to ANDs 802 and 804. AND 802 receives the parity bit A0 and has an output lead 806 connected through OR 516 to one of ANDs 512. The other ANDs 512 receive bits A1–A4 from the A Bus receivers 100.

When F3 goes true it enables AND 804 and the resulting signal on lead 808 is passed through OR 510 to enable all of the ANDs 512. This gates the contents of the A Bus through ORs 518 to Latch 2. At the same time, the output of AND 804 is applied by way of lead 810 and OR 520 to the enabling input of Latch 2 to load the contents of the A Bus into the latch.

During Mode 3 the contents of the A Bus are loaded into Latch F3 if F1F2=11 when 3 goes true. The signals F1F2=11 and Mode 3 enable AND 812 which produces an output signal to enable one input of AND 814. AND 814 also receives the signal F3 and produces an output signal that passes through OR 816 to enable a set of ANDs 818. The value from the A Bus, as represented by the signals derived from the A Bus receivers 100, is applied to ANDs 818 and thus are gated through ANDs 818, over bus 820, and through ORs 526 to the data inputs of Latch 3. The output of AND 814 is applied over lead 822 and through OR 528 to the enabling input of Latch 3 to load therein the contents of the A Bus.

Bit F8 is used as an enabling signal to allow the contents of the latch selected by the bits F1 and F2 to be gated onto the A Bus. In FIG. 7, the signals F1F2=00 and F8 are applied to an AND 720 having its output connected to an AND 722. AND 722 is also enabled by the signal Mode 3. The output of AND 722 is connected by way of leads 724 and 726 to ORs 450 and 467. The output from OR 467 enables AND 468 to pass the parity bit from Latch 0 through AND 468 and OR 466 to the bus 458. The output of OR 450 enables the ANDs 452 to pass L01–L04 from Latch 0 to the bus 458. As previously explained, the bus 458 acts through ORs 152 to drive the A Bus drivers 101.

The output of Latch 1 may be utilized to drive the A Bus during Mode 3 when F1F2=01 and F8 is true. The signals F1F2=01 and F8 are applied to an AND 730 having its output connected to an AND 732. This AND is further enabled by the Mode 3 signal to produce an output signal that enables one input of a set of ANDs 734. ANDs 734 receive the output signals L10–L14 from Latch 1 and these signals are passed over a bus 736 and through ORs 152 to drive the A Bus drivers 101.

The contents of Latch 2 may be utilized to drive the A Bus when F1F2=10 and F8=1. The signals F8 and F1F2=10 are applied to an AND 830 having its output connected to an AND 832. AND 832 is further enabled by the Mode 3 signal and when fully enabled produces an output signal on lead 834 that passes through OR 568 to enable AND 570 and through OR 550 to enable the set of ANDs 552. The parity bit L20 is applied to AND 570 and passes through AND 570 and OR 566 to the bus 558. ANDs 552 receive the signals L21–L24 and pass these signals onto the bus 558. As previously explained, the signals on bus 558 are passed through ORs 152 to drive the drivers 101 for the A Bus.

The contents of Latch 3 may be utilized to drive the A Bus when F1F2=11 and F8=1. The signals F1F2=11 and F8 are applied to an AND 840 having its output connected to an AND 842. AND 842 is further enabled by the Mode 3 signal and has its output connected to a set of ANDs 844. ANDs 844 are connected to receive the output signals L30–L34 from Latch 3, and the outputs from ANDs 844 are connected by a bus 846 to ORs 152 which drive the A Bus drivers 101.

Bits F4–F7 are utilized in Mode 3 to control the loading of Latches 0, 1, 2, and 3 from Buses B, C, D, and E according to the following schedule.

| | |
|---|---|
| F4 = 1 | B Bus to Latch 0 |
| F5 = 1 | C Bus to Latch 1 |
| F6 = 1 | D Bus to Latch 2 |
| F7 = 1 | E Bus to Latch 3 |

Latch 0 is loaded from Bus B as follows. The Mode 3 and F4 signals are applied to an AND 750. The output of AND 750 is applied over lead 752 and through OR 416 to the enabling input of Latch 0. The output of AND 750 is passed through an OR 754 to enable a set of ANDs 756. ANDs 756 receive the outputs of the receivers 102 which receive the B Bus bits B0–B4. The outputs from ANDs 756 are passed over bus 758 and through ORs 412 to the data inputs of Latch 0.

In a similar manner, Latch 1 is loaded with the value on the C Bus if F5=1. The signals Mode 3 and F5 enable an AND 760 having an output connected through an OR 799 to a set of ANDs 762. ANDs 762 receive the signals C0–C4 from the C Bus receivers 104. The outputs from ANDs 762 are applied over bus 764 and through ORs 422 to the data inputs of Latch 1. The output of AND 760 is applied over lead 766 and through OR 424 to the enabling input of Latch 1 thereby entering into the latch the value present on the C Bus.

A value on the D Bus is loaded into Latch 2 during Mode 3 if F6=1. The signals Mode 3 and F6 enable an AND 850 having an output connected through an OR 852 to a set of ANDs 854. ANDs 854 receive the signals D0–D4 from the outputs of the D Bus receivers 106. The outputs from ANDs 854 are applied by way of bus 856 and ORs 518 to the data inputs of Latch 2. The output of AND 850 is also applied by way of lead 858 and OR 520 to the enabling input of Latch 2 thereby enabling the value on the D Bus to be loaded into the latch.

During mode 3 the value on the E Bus may be loaded into Latch 3 if F7=1. The signals Mode 3 and F7 are applied to an AND 860 having its output connected through an OR 862 to a set of ANDs 864. ANDs 864 receive the signals E0–E4 from the outputs of the E Bus receivers 108. The outputs from ANDs 864 are connected over bus 866 and ORs 526 to the data inputs of Latch 3. The output of AND 860 is connected over lead 868 and through OR 528 to the enabling input of Latch 3 thus storing the contents of the E Bus in Latch 3.

In Mode 3, bits F9–F12 selectively control the L0, L1, L2 and L3 output gates to permit these gates to drive the buses B, C, D, and E, respectively. F9 controls the gating of Latch 0 for driving Bus B. In FIG. 7, the signals Mode 3 and F9 are applied to an AND 770 having its output connected to a set of ANDs 772. ANDs 772 are connected to receive the outputs from Latch 0. The outputs from ANDs 772 are passed over bus 774 and through ORs 154 to the drivers 103 for driving the B Bus.

In Mode 3 bit F10 controls the output of Latch 1. In FIG. 7, the signals Mode 3 and F10 are applied to an AND 780 having its output connected to a set of ANDs 782. ANDs 782 receive output signals from Latch 1. The output signals from ANDs 782 pass over bus 784 and through ORs 156 to the drivers 105 for driving the C Bus.

In Mode 3 the bit F11 controls the output of Latch 2 for driving the D Bus. In FIG. 8, the signals Mode 3 and F11 are applied to an AND 870 having its output connected to a set of ANDs 872. ANDs 872 are connected to the outputs of all stages of Latch 2. The output signals from ANDs 872 are passed over bus 874 and through ORs 158 to the drivers 107 for driving the D Bus.

In Mode 3 bit F12 controls the output gating of Latch 3 for driving the E Bus. In FIG. 8, the signals Mode 3 and F12 are applied to an AND 880 having its output connected to a set of ANDs 882. ANDs 882 receive the output signals from all stages of Latch 3. The output signals from ANDs 882 are applied over bus 884 and through ORs 142 to the drivers 109 for driving the E Bus.

There are numerous ways that the MFN may be utilized when operating in Mode 3. The contents of a designated bus may be passed through its associated latch to the A Bus so that changes on the designated bus can be seen on the A Bus after a delay occasioned only by the data path delay. For example, if F1F2=11, F7=1, and F8=1, the contents of the E Bus are made available on the A Bus after a delay equal to the time required for the signals to pass through Latch 3 and its associated input and output circuits. F7 enables Latch 3 so that the output of Latch 3 follows the level of the signals on the E Bus. The signal F8 acts as previously described to enable ANDs 844 to thereby gate the output signals from Latch 3 to the A Bus. In a similar manner, the contents of the B, C, or D Bus may be passed through Latch 0, Latch 1 or Latch 2, respectively, to the A Bus.

The contents of a designated bus B, C, D, or E can be loaded into the associated Latch 0, 1, 2, or 3, stored therein, and then utilized at a later time to drive the same designated bus. Considering again Latch 3, it may be loaded from the E Bus by making F7 first equal to 1 and then 0. At some subsequent time the contents of the latch may be read out to the E Bus by making F12=1. More than one latch may be loaded from its associated bus simultaneously. Also, plural latches may drive their respective associated buses simultaneously.

The contents of a designated bus may be loaded into its associated latch and then subsequently the contents of the latch may be utilized to drive the A Bus, the designated bus, or both buses simultaneously. As an example, Latch 3 may be loaded from Bus E by making F7=1 and then 0. Subsequently, by making F1F2=11 and F8=1 the contents of Latch 3 may be read out to the A Bus. Simultaneously, or alternatively, the contents of Latch 3 may be read out to Bus E by making F12 first equal to 1.

The contents of the common A Bus can be loaded into any latch and subsequently the contents of the latch may be read out onto the A Bus, the designated bus associated with the latch, or both buses simultaneously. For example, by making F1F2=11 and F3 both true, Latch 3 may be loaded with the contents of the A Bus. Subsequently, the contents of Latch 3 may be read out to the E Bus by making F12=1. Simultaneously or alternatively, once F3=0, the contents of Latch 3 may be read out to the A Bus by making F1F2=11 and F8 both true.

The MFN may be utilized in Mode 3 to accomplish a byte serial-to-parallel conversion operation. The data to be converted is applied to the chip serial by byte over the A Bus. For the first byte F1F2=00 and F3 are made true so that the first byte from the A Bus is loaded into Latch 0 when F3 goes false. Next, F1F2=01 and F3 are made true so that the second byte from the A Bus is loaded into Latch 1 as F3 goes false. Next, F1F2=10 and F3 are made true so that the third byte is loaded into Latch 2. Finally, F1F2=11 and F3 are made true so that the fourth byte is loaded into Latch 3 as F3 goes false. After the latches are loaded they are read out simultaneously to their respective designated buses. This is accomplished by making F9, F10. F11, and F12 all true. F9 gates Latch 0 onto the B Bus, F10 gates the contents of Latch 1 onto the C Bus, F11 gates the contents of Latch 2 onto the D Bus and F12 gates the contents of Latch 3 onto the E Bus.

A parallel-to-serial by byte conversion operation can be accomplished by loading the contents of the four latches from their respective designated buses B, C, D, and E and then reading out the contents of the latches one latch at a time to the A Bus. Latches 0–3 may be loaded simultaneously from their designated buses B–E by making F4–F7 true simultaneously. After the latches are loaded via F4–F7 going false, they may be read out one latch at a time by making F8 true and sequentially making the signals F1F2=00, F1F2=01, F1F2=10, F1F2=11 true.

In summary, the present invention provides a versatile integrated circuit multifunction network arrangement which may be programmed by mode selection signals to operate in any one of a plurality of modes, and capable of performing multiple functions within each mode. The multifunction network can be programmed to operate as a bidirectional bus multiplexer, an error correction assist circuit, a multiport file or a register stack addressing circuit. It can provide fast interconnection between buses, serial-to-parallel or parallel-to-serial conversions, direct and indirect addressing, and logic operations essential to error correction code generation and checking. A preferred embodiment requires only five logic pin connections dedicated to control functions with all other pin connections being made to bidirectional buses.

While a single preferred embodiment has been described in specific detail, it will be understood that various substitutions and modifications may be made in the described embodiment without departing from the spirit and scope of the invention as defined by the appended claims.

The embodiments of the invention in which an exclusive property or privilege is claimed are defined by the following:

1. A single chip integrated circuit multifunction network and connector terminal means for connecting circuits in the network through a mating connector to a plurality of bidirectional buses and to means producing first and second function signals and mode selection signals, said multifunction network comprising:
   a plurality of page registers for storing page values;
   a plurality of index registers for storing index values;
   decoder means enabled by said mode selection signals and responsive to signals on a first of said buses for selectively producing one of a plurality of signals designating a page or index register to be loaded;
   first means connected to a second of said buses, said first means being responsive to the signal produced by said decoder means, and to said first function signal for loading the designated page or index register with the value represented by signals on said second bus;

a storage address register;

means connected to said storage address register for applying page and index values in said storage address register to a third of said buses; and, second means responsive to signals on a further of said buses for gating a page and an index value from said page and index registers, respectively, to said storage address register.

2. A multifunction network as claimed in claim 1 wherein said second means includes:

further gating means for receiving signals from both a fourth and a fifth of said buses, said further gating means being responsive to said second function signal for selecting the signals on one of said fourth and fifth buses as the signals for gating a page and an index value to said storage address register.

3. A multifunction network as claimed in claim 1 wherein a signal from said first bus is applied as a load enabling signal to said storage address register.

4. A multifunction network as claimed in claim 1 wherein said first means includes means responsive to selected ones of said plurality of signals generated by said decoder means for loading a second designated page or index register with signals from another of said buses simultaneously with the loading of said designated page or index register.

5. A multifunction network as claimed in claim 1 wherein said decoder means produces further signals designated one or more page and index registers to be read out, said multifunction network further comprising means responsive to said further signals for gating the values in the designated page or index registers to said second bus and another of said buses.

6. A single chip integrated circuit multifunction network and connector terminal means for connecting circuits in the network through a mating connector to first, second, third, fourth, fifth and sixth bidirectional buses, to sources of first and second function control signals, to a source of chip enable signals and to first and second mode selection signals, said multifunction network comprising:

first, second, third, fourth, fifth and sixth receiver means, there being a receiver means associated with each of said buses for receiving signals therefrom;

first, second, third, fourth, fifth and sixth driver means, there being a driver means associated with each of said buses for applying signals thereto;

said receiver means and said driver means being enabled in response to said chip enable signals;

mode decode means responsive to said first and second mode selection signals for producing mode signals each indicating a selected mode in which the multifunction network is to operate;

function means responsive to said function control signals for producing first and second function signals indicating a function to be performed within a selected mode;

first circuit means responsive to signals from said first, second, third, fourth and sixth receiver means, a first of said mode signals from said mode decode means, and said function signals for applying to said fifth driver means signals representing a value on said first, second, third or fourth bus;

second circuit means connected to said fifth receiver means and responsive to said first of said mode signals and said first and second function signals for applying signals representing a value on said fifth bus to one of said first, second, third or fourth driver means;

a first Exclusive OR circuit connected to said first, second, third, fourth and sixth receiver means for generating the Exclusive OR of corresponding bit positions on said first, second, third, fourth and sixth buses;

a second Exclusive OR circuit connected to said fifth receiver means and said first Exclusive OR circuit for generating the Exclusive OR of corresponding bit positions of all said buses; and, further means responsive to a second of said mode signals and said first and second function signals for applying the outputs from said second Exclusive OR circuit to all said driver means when said first and second function signals have a first combination of states, for applying the outputs from said first Exclusive OR circuit to said fifth driver means when said first and second function signals have a second combination of states, and connecting said fifth receiver means to said first, second, third, fourth and sixth driver means when said first and second function signals have a third combination of states.

7. A multifunction network as claimed in claim 6 wherein said further means includes a latch means connected to said second Exclusive OR circuit;

an error location matrix having inputs connected to said latch means and outputs connected to said sixth driver means; and, gating means connecting said latch means to all said driver means.

8. A multifunction network as claimed in claim 6 and further comprising:

first, second, third and fourth latch means; and, loading means connected to said first and second function signals for loading a value from the first bus into one of said latch means as determined by said first and second function signals.

9. A multifunction network as claimed in claim 9 including means connecting said sixth receiver means to said loading means whereby a signal on the sixth bus may time the loading of said one latch means.

10. A multifunction network as claimed in claim 9 and further comprising:

gating means connected between said first, second, third and fourth latch means and said first driver means, and responsive to said first and second function signals and a further signal on said sixth bus for transferring a value in one of said latch means to said first bus.

11. A multifunction network as claimed in claim 8 wherein said loading means includes gating means connected to said sixth receiver means and connected between said second, third, fourth and fifth receivers and said first, second, third and fifth latch means, respectively, and responsive to signals on said sixth bus, said sixth bus signals designating one or more of said latch means which is to be loaded from one or more of said buses.

12. A multifunction network as claimed in claim 11 and further including gating means connected to said sixth receiver means and responsive to signals therefrom for transferring values in selected ones of said latch means to selected ones of said driver means.

* * * * *